(12) United States Patent
Zhang et al.

(10) Patent No.: US 11,909,085 B2
(45) Date of Patent: Feb. 20, 2024

(54) AIR ELECTRODES OF SOLID OXIDE ELECTROCHEMICAL CELLS

(71) Applicants: Phillips 66 Company, Houston, TX (US); Georgia Tech Research Corporation, Atlanta, GA (US)

(72) Inventors: Weilin Zhang, Atlanta, GA (US); Meilin Liu, Alpharetta, GA (US); Ying Liu, Bartlesville, OK (US); Yucun Zhou, Atlanta, GA (US)

(73) Assignees: Phillips 66 Company, Houston, TX (US); Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 17/476,032

(22) Filed: Sep. 15, 2021

(65) Prior Publication Data

US 2022/0109174 A1    Apr. 7, 2022

Related U.S. Application Data

(60) Provisional application No. 63/086,486, filed on Oct. 1, 2020.

(51) Int. Cl.
| | |
|---|---|
| *H01M 4/90* | (2006.01) |
| *H01M 8/18* | (2006.01) |
| *C25B 1/04* | (2021.01) |
| *H01M 8/1213* | (2016.01) |
| *H01M 8/12* | (2016.01) |

(52) U.S. Cl.
CPC ............... *H01M 8/186* (2013.01); *C25B 1/04* (2013.01); *H01M 8/1213* (2013.01); *H01M 2008/1293* (2013.01)

(58) Field of Classification Search
CPC ........................... H01M 8/186; H01M 8/1213
See application file for complete search history.

(56) References Cited

U.S. PATENT DOCUMENTS

| | | | |
|---|---|---|---|
| 8,802,321 B2 * | 8/2014 | Larsen | H01M 4/8835 |
| | | | 429/495 |
| 10,008,731 B2 * | 6/2018 | Lim | H01M 8/126 |
| 11,179,682 B2 | 11/2021 | Yildiz et al. | |
| 2010/0291471 A1 | 11/2010 | Jacobson et al. | |

FOREIGN PATENT DOCUMENTS

| | | |
|---|---|---|
| WO | WO 2013/165079 | 11/2013 |
| WO | WO 2019/079231 | 4/2019 |

OTHER PUBLICATIONS

Saccoccio et al. (international journal of hydrogen energy 42 (2017) 19204-19215).*

(Continued)

*Primary Examiner* — Olatunji A Godo
(74) *Attorney, Agent, or Firm* — FisherBroyles, LLP

(57) ABSTRACT

Disclosed are air electrode materials suitable for use in solid oxide electrochemical cells (SOCs). The disclosed cells can operate in a dual function modes, i.e., as a fuel cell and as an electrolysis cell. In both cases, chemical energy and electrical energy can be directly convert from one mode to the other; thereby providing a highly efficient energy conversion process that can be used as a sustainable energy source.

1 Claim, 20 Drawing Sheets

(56) References Cited

OTHER PUBLICATIONS

Wang et al. (international journal of hydrogen energy 39 (2014) 18392-18404).*
International Search Report and Written Opinion from counterpart Int'l Pat. App. PCT/US2021/050451, dated Dec. 8, 2021 (7 pp.).
Politov, B.V., et al., "Crystal Structure and Cation Ordering in Novel Perovskite Type Oxides PrBaCoTa(Nb)$O_{6-\sigma}$," Journal of Alloys and Compounds, vol. 824, available online Jan. 23, 2020 (12 pp.).
Zhang, W., et al., "A Highly Efficient and Durable Air Electrode for Intermediate-Temperature Reversible Solid Oxide Cells," Applied Catalysis B: Environmental, vol. 299, available online Aug. 15, 2021 (7 pp.).
Chen et al., "A Highly Active, $CO_2$-Tolerant Electrode for the Oxygen Reduction Reaction," Energy Environ. Sci. 11, pp. 2458-2466, Jun. 11, 2018 (24 pp.).
Chen et al., "A Highly Efficient Multi-Phase Catalyst Dramatically Enhances the Rate of Oxygen Reduction," Joule 2, pp. 938-949, Mar. 1, 2018 (13 pp.).
Chen et al., "A Robust and Active Hybrid Catalyst for Facile Oxygen Reduction in Solid Oxide Fuel Cells," Energy Environ. Sci. 10, pp. 964-971, Mar. 14, 2017 (8 pp.).
Chen et al., "A Robust Fuel Cell Operated on Nearly Dry Methane at 500 ° C. Enabled by Synergistic Thermal Catalysis and Electrocatalysis," Nat. Energy, pp. 1042-1050, Dec. 2018 (9 pp.).
Chen et al., "Surface Segregation in Solid Oxide Cell Oxygen Electrodes: Phenomena, Mitigation Strategies and Electrochemical Properties," Electrochem. Energy Rev. 3, pp. 730-765, Aug. 10, 2020 (36 pp.).
Choi et al., "Exceptional Power Density and Stability at Intermediate Temperatures in Protonic Ceramic Fuel Cells," Nat. Energy 3 (2018), pp. 202-210, Feb. 12, 2018 (28 pp.).
Choi et al., "Highly Efficient and Robust Cathode Materials for Low-Temperature Solid Oxide Fuel Cells: $PrBa_{0.5}Sr_{0.5}Co_{2-x}Fe_xO_{5+\delta}$," Sci. Rep. 3, 2426, Aug. 15, 2013 (6 pp.).
Choi et al., "Protonic Ceramic Electrochemical Cells for Hydrogen Production and Electricity Generation: Exceptional Reversibility, Stability, and Demonstrated Faradaic Efficiency," Energy Environ. Sci., 2019, 12, pp. 206-215, Dec. 13, 2018 (31 pp.).
Ding et al., "Enhancing SOFC Cathode Performance by Surface Modification Through Infiltration," Energy Environ. Sci. 7, pp. 552-575, 2014 (24 pp.).
Ding et al., "High Performance Anode-Supported Solid Oxide Fuel Cell Based on Thin-Film Electrolyte and Nanostructured Cathode," Energy Environ. Sci., 2010, 3, pp. 1729-1731, Sep. 28, 2010 (3 pp.).
Ding et al., "Self-Sustainable Protonic Ceramic Electrochemical Cells Using a Triple Conducting Electrode for Hydrogen and Power Production," Nat. Commun. 11, Apr. 20, 2020 (11 pp.).
Dong et al., "Structural and Oxygen-Transport Studies of Double Perovskites $PrBa_{1-x}Co_2O_{5+\delta}$(x=0.00, 0.05, and 0.10) Toward Their Application as Superior Oxygen Reduction Electrodes," J. Mater. Chem. A, 2014, 2, pp. 20520-20529, Sep. 26, 2014 (12 pp.).
Druce et al., "Surface Termination and Subsurface Restructuring of Perovskite-Based Solid Oxide Electrode Materials," Energy Environ. Sci. 7, pp. 3593-3599, Jul. 23, 2014 (7 pp.).
Duan et al., "Highly Durable, Coking and Sulfur Tolerant, Fuel-Flexible Protonic Ceramic Fuel Cells," Nature 557, pp. 217-222, May 10, 2018 (19 pp.).
Duan et al., "Highly Efficient Reversible Protonic Ceramic Electrochemical Cells for Power Generation and Fuel Production," Nat. Energy 4, pp. 230-240, Mar. 11, 2019 (39 pp.).
Duan et al., "Proton-Conducting Oxides for Energy Conversion and Storage," Appl. Phys. Rev. 7, 011314, Mar. 3, 2020 (41 pp.).
Duan et al., "Readily Processed Protonic Ceramic Fuel Cells with High Performance at Low Temperatures," Science 349, pp. 1321-1326, Jul. 23, 2015 (12 pp.).
Duan et al., "Zr and Y Co-doped Perovskite as a Stable, High Performance Cathode for Solid Oxide Fuel Cells Operating Below 500 ° C.," Energy Environ. Sci. 10, pp. 176-182, Oct. 7, 2016 (8 pp.).
Ebbesen et al., "High Temperature Electrolysis in Alkaline Cells, Solid Proton Conducting Cells, and Solid Oxide Cells," Chem. Rev. 114, 10697-10734, Oct. 6, 2014 (38 pp.).
Gao et al., "A Perspective on Low-Temperature Solid Oxide Fuel Cells," Energy Environ. Sci. 9, pp. 1602-1644, Feb. 2, 2016 (43 pp.).
Grimaud et al., "Hydration Properties and Rate Determining Steps of the Oxygen Reduction Reaction of Perovskite-Related Oxides as H+-SOFC Cathodes," J. Electrochem. Soc. 159 (6), pp. B683-B694, Apr. 2, 2012 (12 pp.).
Haile, "Fuel Cell Materials and Components," Acta Mater. 51, pp. 5981-6000, Nov. 25, 2003 (20 pp.).
Huan et al., "New, Efficient, and Reliable Air Electrode Material for Proton-Conducting Reversible Solid Oxide Cells," ACS Appl. Mater. Interfaces, 2018, 10, pp. 1761-1770, Dec. 28, 2017 (28 pp.).
Kim et al., "Hybrid-Solid Oxide Electrolysis Cell: A New Strategy for Efficient Hydrogen Production," Nano Energy 44 (2018), pp. 121-126, Dec. 5, 2017 (6 pp.).
Kim et al., "Layered $LnBaCo_2O_5+$% Perovskite Cathodes for Solid Oxide Fuel Cells: An Overview and Perspective," J. Mater. Chem. A, 2015, 3, p. 24195-24210, Oct. 19, 2015 (16 pp.).
Kim et al., "Proton Conducting Oxides: A Review of Materials and Applications for Renewable Energy Conversion and Storage," Renew. Sustain. Energy Rev. 109, pp. 606-618, Apr. 24, 2019 (13 pp.).
Kim et al., "Triple-Conducting Layered Perovskites as Cathode Materials for Proton-Conducting Solid Oxide Fuel Cells," ChemSusChem 7, pp. 2811-2815, Aug. 21, 2014 (6 pp.).
Kresse, "Efficient Iterative Schemes for Ab Initio Total-Energy Calculations Using a Plane-Wave Basis Set," Phys. Rev. B 54, p. 11169-11186, Oct. 15, 1996 (18 pp.).
Kuai et al., "Boosting the Activity of $BaCo_{0.4}Fe_{0.4}Zr_{0.1}Y_{0.1}O_{3-\delta}$Perovskite for Oxygen Reduction Reactions at Low-to-Intermediate Temperatures Through Tuning B-Site Cation Deficiency," Adv. Energy Mater., 2019, 1902384, Aug. 27, 2019, (11 pp.).
Lee et al., "Tailoring Gadolinium-Doped Ceria-Based Solid Oxide Fuel Cells to Achieve 2 W $Cm^{-2}$ at 550 ° C.," Nat. Commun. 5.4045, Jun. 4, 2014 (10 pp.).
Li et al., "High Performing Triple-Conductive $Pr_2NiO_{4+\delta}$Anode for Proton-Conducting Steam Solid Oxide Electrolysis Cell," J. Mater. Chem. A, 2018, 6, pp. 18057-18066, Aug. 10, 2018 (18 pp.).
Lin et al., "Evaluation of $Ba_{0.5}Sr_{0.5}Co_{0.8}Fe_{0.2}O_{3-\delta}$as a Potential Cathode for an Anode-Supported Proton-Conducting Solid-Oxide Fuel Cell," J. Power Sources 180 (2008), pp. 15-22, Feb. 26, 2008 (8 pp.).
Liu et al., "Rational SOFC Material Design: New Advances and Tools," Materials Today 14, 11, pp. 534-546, Nov. 17, 2011 (13 pp.).
Liu, "Distributions of Charged Defects in Mixed Ionic-Electronic Conductors," J. Electrochem. Soc. 144, pp. 1813-1834, May 1997 (22 pp.).
Methfessel et al., "High-Precision Sampling for Brillouin-Zone Integration in Metals," Phys. Rev. B Condens. Matter 40, pp. 3616-3621, Aug. 15, 1989 (6 pp.).
Monkhorst et al., "Special Points for Brillouin-Zone Integrations," Phys. Rev. B 13, pp. 5188-5192, Jun. 15, 1976 (5 pp.).
Park et al., "Oxygen Electrocatalysts for Water Electrolyzers and Reversible Fuel Cells: Status and Perspective," Energy Environ. Sci. 5, Aug. 29, 2012 (14 pp.).
Pellow et al., "Hydrogen or Batteries for Grid Storage? A Net Energy Analysis." Energy & Environmental Science 8, 2015, pp. 1938-1952, Apr. 2015 (15 pp.).
Perdew et al., "Generalized Gradient Approximation Made Simple," Phys. Rev. Lett. 77, pp. 3865-3868, Oct. 28, 1996 (4 pp.).
Ren et al., "Tuning the Defects of the Triple Conducting Oxide $BaCo_{0.4}Fe_{0.4}Zr_{0.1}Y_{0.1}O_{3-\delta}$Perovskite Toward Enhanced Cathode Activity of Protonic Ceramic Fuel Cells," J. Mater. Chem. A, 2019, 7, pp. 18365-18372, Jul. 10, 2019 (22 pp.).
Shao et al., "A High-Performance Cathode for the Next Generation of Solid-Oxide Fuel Cells," Nature 431, pp. 170-173, Sep. 9, 2004, (4 pp.).

(56) References Cited

OTHER PUBLICATIONS

Song et al., "A Cobalt-Free Multi-Phase Nanocomposite as Near-Ideal Cathode of Intermediate- Temperature Solid Oxide Fuel Cells Developed by Smart Self-Assembly," Adv. Mater. (2020), e1906979, Jan. 15, 2020 (9 pp.).
Song et al., "Self-Assembled Triple-Conducting Nanocomposite as a Superior Protonic Ceramic Fuel Cell Cathode," Joule, Nov. 20, 2019 (13 pp.).
Suntivich et al., "A Perovskite Oxide Optimized for Oxygen Evolution Catalysis from Molecular Orbital Principles," Science 334, pp. 1383-1385, Dec. 9, 2011 (24 pp.).
Tang et al., "Understanding of A—Site Deficiency in Layered Perovskites: Promotion of Dual Reaction Kinetics for Water Oxidation and Oxygen Reduction in Protonic Ceramic Electrochemical Cells," J. Mater. Chem. A, 2020, 8, pp. 14600-14608, Jun. 25, 2020 (16 pp.).
Téllez et al., "Surface Chemistry Evolution in $LnBaCo_2O_{5+\delta}$ Double Perovskites for Oxygen Electrodes," Int. J. Hydrogen Energy 39, pp. 20856-20863, Dec. 3, 2014 (8 pp.).
Tsvetkov et al., "Improved Chemical and Electrochemical Stability of Perovskite Oxides with Less Reducible Cations at the Surface," Nat. Mater. 15, pp. 1010-1016, Jun. 13, 2016 (23 pp.).
Vollestad et al., "Mixed Proton and Electron Conducting Double Perovskite Anodes for Stable and Efficient Tubular Proton Ceramic Electrolysers," Nat. Mater., pp. 752-761, Jun. 3, 2019 (10 pp.).
Wei et al., "Surface Cation Segregation and Chromium Deposition on the Double-Perovskite Oxide $PrBaCo_2O_{5+\delta}$," ACS Appl. Mater. Interfaces 10, pp. 8621-8629, Feb. 16, 2018 (9 pp.).
Wu et al., "3D Self-Architectured Steam Electrode Enabled Efficient and Durable Hydrogen Production in a Proton-Conducting Solid Oxide Electrolysis Cell at Temperatures Lower Than 600 °C.," Adv. Sci., 2018, 5, 1800360, Aug. 31, 2018 (9 pp.).
Wu et al., "Modelling of Ambipolar Transport Properties of Composite Mixed Ionic-Electronic Conductors," Solid State Ion., 93 pp. 65-84, Dec. 1996 (20 pp.).
Yang et al., "Toward Reducing the Operation Temperature of Solid Oxide Fuel Cells: Our past 15 Years of Efforts in Cathode Development," Energy Fuels 34, pp. 15169-15194, Jul. 29, 2020 (26 pp.).
Yasuda et al., "Electrical Conductivity and Chemical Diffusion Coefficient of Sr-Doped Lanthanum Chromites," Solid State Ion. 80, pp. 141-150, Aug. 1995 (10 pp.).
Yasuda et al., "Precise Determination of the Chemical Diffusion Coefficient of Calcium-Doped Lanthanum Chromites by Means of Electrical Conductivity Relaxation," J. Electrochern. Soc. 141, pp. 1268-1273, May 1994 (.
Zhang et al., "Cobalt-Substituted $SrTi_{0.3}Fe_{0.7}O_{3-\delta}$: A Stable High-Performance Oxygen Electrode Material for Intermediate-Temperature Solid Oxide Electrochemical Cells," Energy Environ. Sci. 11, pp. 1870-1879, May 19, 2018 (24 pp.).
Zhang et al., "Synthesis, Characterization and Evaluation of Cation-Ordered $LnBaCo_2O_{5+\delta}$ as Materials of Oxygen Permeation Membranes and Cathodes of SOFCs," Acta Mater. 56, pp. 4876-4889, Jul. 9, 2008 (14 pp.).
Zhao et al., "A Tailored Double Perovskite Nanofiber Catalyst Enables Ultrafast Oxygen Evolution," Nat. Commun. 8.14586, Feb. 27, 2017 (9 pp.).
Zhang, et al., "A Highly Efficient and Durable Air Electrode for Intermediate-Temperature Reversible Solid Oxide Cells," Applied Catalysis B: Environmental 299 (2021) 120631, Aug. 15, 2021 (7 pp.).

\* cited by examiner

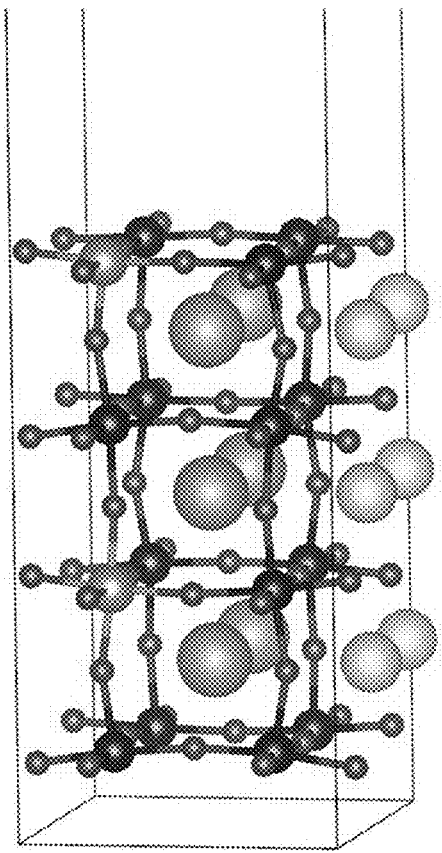 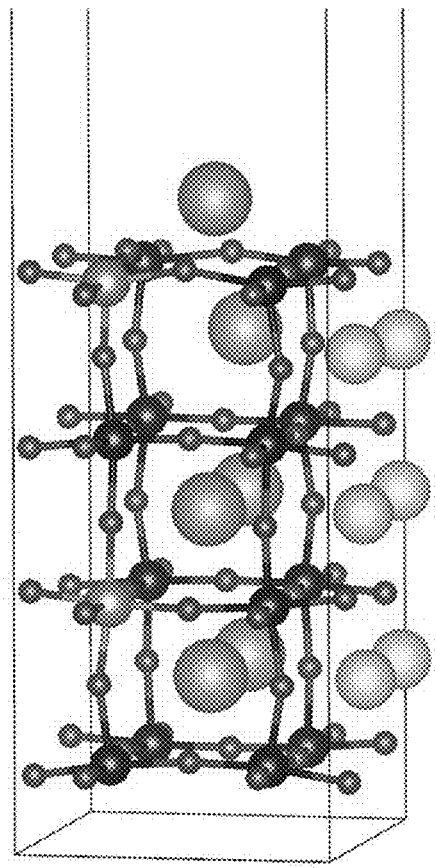
Fig. 5E Fig. 5F
|  | PBCO | Nb-doped PBCO |
|---|---|---|
| $E_c$ | -222.508 | -231.357 |
| $E_f$ | -76.679 | -83.653 |
| $E_s$ | 0.786 | 1.088 |
Fig. 5G

AIR ELECTRODES OF SOLID OXIDE ELECTROCHEMICAL CELLS

FIELD

Disclosed are air electrode materials suitable for use in solid oxide electrochemical cells (SOCs). The disclosed cells can operate in a dual function modes, i.e., as a fuel cell and as an electrolysis cell. In both cases, chemical energy and electrical energy can be directly convert from one mode to the other; thereby providing a highly efficient energy conversion process that can be used as a sustainable energy source.

BRIEF DESCRIPTION OF THE FIGURES

FIG. 1A shows the drawing of solid oxide fuel cells (SOFCs). The oxygen reduction reaction (ORR) takes place at the air electrode (cathode), the hydrogen oxidation reaction (HOR) takes place at the fuel electrode (anode), and the oxygen ion transport through the electrolyte. FIG. 1B shows the drawing of protonic conducting fuel cells (PCFCs), in which proton transport through the electrolyte. FIG. 1C shows the drawing of protonic conducting electrolysis cells. The oxygen evolution reaction (OER) takes place at the air electrode (positive electrode), and the hydrogen evolution reaction takes place at the fuel electrode (negative electrode).

FIG. 3A compares the change of interfacial polarization resistance ($R_p$) of both materials at 600° C. under the open circuit conditions (OCV). FIGS. 3B and 3C show the surface of PBCO and PB10CN electrodes after a stability test at 600° C.

FIG. 4A shows the surface of a fresh PB sample. FIG. 4B shows the surface of a fresh PBCO sample. FIG. 4C shows the surface of an annealed PB10CN sample. FIG. 4D shows the surface of an annealed PBCO sample. FIG. 4E shows the elemental distribution at the precipitated particle on the surface of annealed PBCO.

FIGS. 5A to 5G display the atomic level function of Nb doping by density functional theory (DFT) based calculation. FIG. 5A represents the calculation model of PBCO. FIG. 5B represents the calculation model of Nb doped PBCO. FIG. 5C shows the charge density difference of PBCO. FIG. 5D shows the charge density difference of Nb doped PBCO. FIG. 5E shows the calculation model of the PBCO surface. FIG. 5F shows the calculation model of the PBCO surface with Ba segregation. FIG. 5G is a table comparing the cohesive energy ($E_c$), formation energy ($E_f$), Ba segregation energy ($E_s$) difference between PBCO and Nb-doped PBCO.

FIG. 6A shows the electrical conductivity of PB9CN and PB10CN. FIG. 6B shows the oxygen non-stoichiometry of PB9CN and PB10CN. FIG. 6C shows the surface kinetic coefficient (k) and chemical diffusion coefficient (D) of PB9CN and PB10CN. FIG. 6D shows the interfacial polarization resistance ($R_p$) of PB9CN and PB10CN.

FIG. 7A shows the comparison of interfacial polarization resistance ($R_p$) of PB9CN and other state-of-the-art air electrode materials under the dry air condition. FIG. 7B shows the durability of PB9CN under dry air and OCV conditions. FIG. 7C is a plot of the I-V-P curves of a fuel cell with a configuration of Ni-GDC|GDC|PB9CN. FIG. 7D is a graph of the comparison of peak power density of GDC-based single cells with PB9CN and other state-of-the-art air electrode materials. FIG. 7E demonstrates the durability of a single cell with a configuration of Ni-GDC|GDC|PB9CN at 500° C.

FIG. 8A is a plot of the I-V-P curves of a fuel cell with a configuration of Ni-BZCYYb|BZCYYb|PB9CN-BZCYYb. FIG. 8B shows the comparison of peak power density of BZCYYb-based single cells with PB9CN and other state-of-the-art air electrode materials. FIG. 8C shows the comparison of interfacial polarization resistance ($R_p$) of PB9CN and other state-of-the-art air electrode materials under the humidified air condition (~3 vol % $H_2O$). FIG. 8D depicts the electrolysis performance of a single cell with a configuration of Ni-BZCYYb|BZCYYb|PB9CN-BZCYYb. FIG. 8E indicates the observed durability of PB9CN under humidified air (3 vol % $H_2O$) and OCV conditions. FIG. 8F shows the durability of an electrolysis cell with a configuration of Ni-BZCYYb|BZCYYb|PB9CN-BZCYYb at 600° C.

DETAILED DESCRIPTION

Figure 1A:
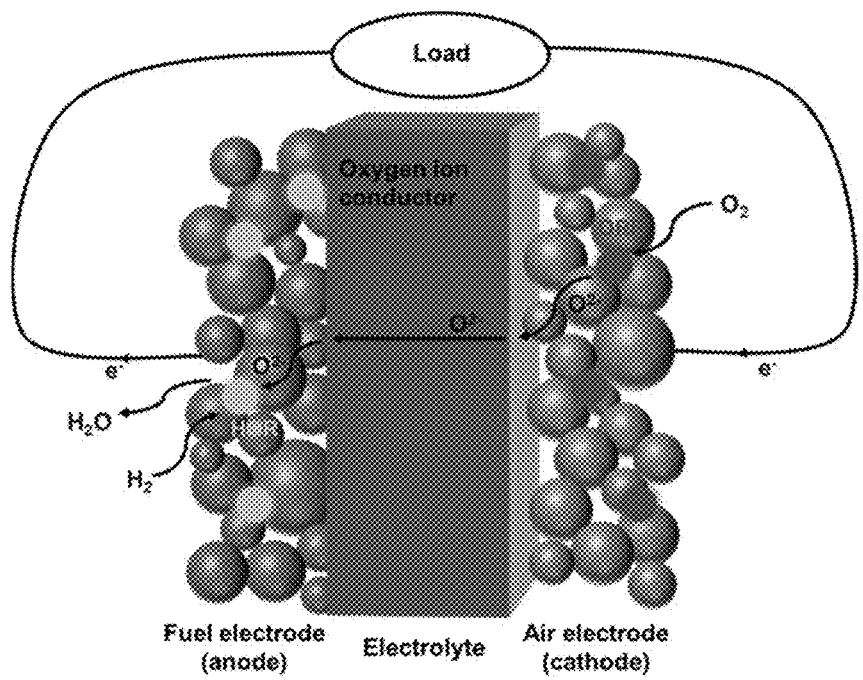
FIG. 1A to 1C are the drawings of several kinds of solid oxide electrochemical cells (SOCs).
Figure 1B:
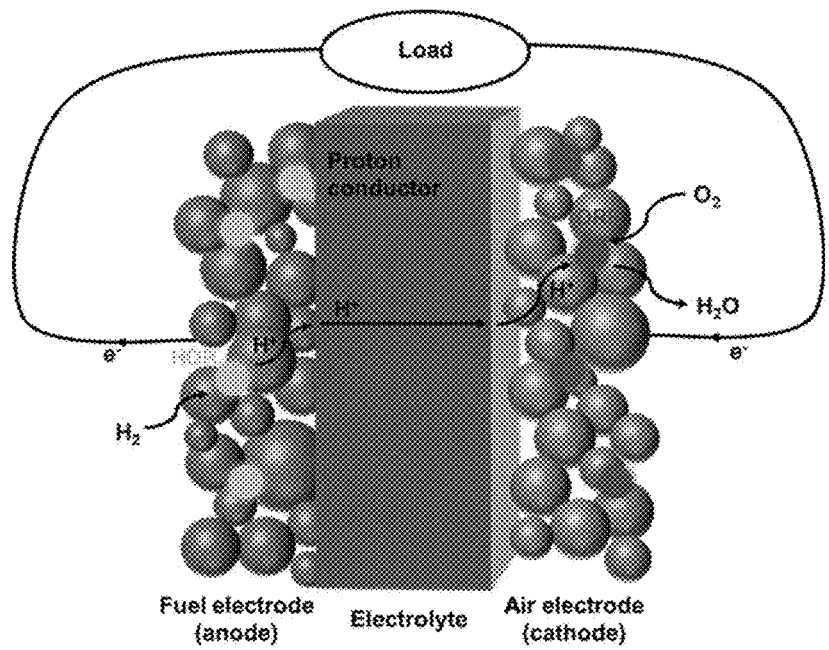
Figure 1C:
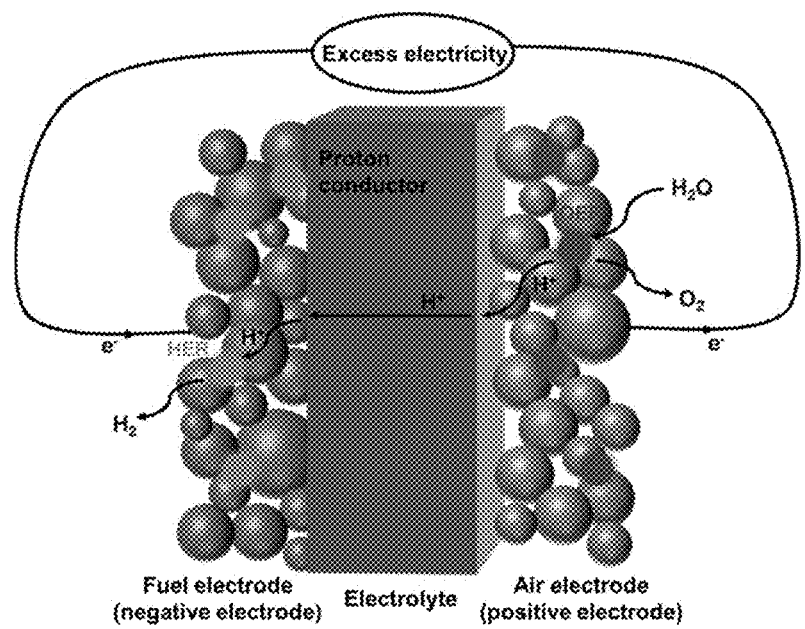

The materials, compounds, compositions, articles, and methods described herein may be understood more readily by reference to the following detailed description of specific aspects of the disclosed subject matter and the Examples included therein.

Before present materials, compounds, compositions, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

All percentages, ratios and proportions herein are by weight, unless otherwise specified. All temperatures are in degrees Celsius (° C.) unless otherwise specified.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, an apparatus that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed, then "less than or equal to" the value, "greater than or equal to the value," and possible ranges between values are also disclosed, as appropriately understood by the skilled artisan. For example, if the value "10" is disclosed, then "less than or equal to 10" as well as "greater than or equal to 10" is also disclosed. It is also understood that throughout the application data are provided in a number of different formats and that this data represent endpoints and starting points and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

The terms "a" and "an" are defined as one or more unless this disclosure explicitly requires otherwise. Ranges may be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Values expressed as "greater than" do not include the lower value. For example, when the "variable x" is defined as "greater than zero" expressed as "0<x" the value of x is any value, fractional or otherwise that is greater than zero. Similarly, values expressed as "less than" do not include the upper value. For example, when the "variable x" is defined as "less than 2" expressed as "x<2" the value of x is any value, fractional or otherwise that is less than 2.

"Optional" or "optionally" means that the subsequently described event or circumstance can or cannot occur, and that the description includes instances where the event or circumstance occurs and instances where it does not Any embodiment of any of the apparatuses, systems, and methods can consist of or consist essentially of rather than comprise/include/contain/have any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. The feature or features of one embodiment may be applied to other embodiments, even though not described or illustrated, unless expressly prohibited by this disclosure or the nature of the embodiments.

In the disclosure and appended Claims, the following nomenclature is provided: $PrBa_{0.9}Co_{1.96}Nb_{0.04}O_{5+\delta}$ is referred to as PB9CN, $PrBaCo_{1.96}Nb_{0.04}O_{5+\delta}$ is referred to as PB10CN and $PrBaCo_2O_{5+\delta}$ is referred to as PBCO.

One aspect of the disclosure relates to a multi-functional air electrode for solid oxide electrochemical cells, having the formula:

$$PrBa_{0.9}Co_{1.96}Nb_{0.04}O_{5+\delta}.$$

Another aspect of the disclosure relates to Ba deficient, Nb doped multi-functional air electrode for solid oxide electrochemical cells, having the formula:

$$PrBa_{1-x}Co_{2-y}Nb_yO_{5+\delta}$$

wherein the index x is from about 0.1 to about 0.5, and the index y is from 0.01 to about 0.07. Non-limiting examples of this aspect includes:
$PrBa_{0.9}Co_{1.97}Nb_{0.03}O_{5+\delta}$, $PrBa_{0.9}Co_{1.95}Nb_{0.05}O_{5+\delta}$, $PrBa_{0.9}Co_{1.93}Nb_{0.07}O_{5+\delta}$, $PrBa_{0.9}Co_{1.92}Nb_{0.08}O_{5+\delta}$, $PrBa_{0.85}Co_{1.96}Nb_{0.04}O_{5+\delta}$, $PrBa_{0.85}Co_{1.95}Nb_{0.05}O_{5+\delta}$, $PrBa_{0.85}Co_{1.94}Nb_{0.06}O_{5+\delta}$, $PrBa_{0.85}Co_{1.93}Nb_{0.07}O_{5+\delta}$, $PrBa_{0.8}Co_{1.96}Nb_{0.04}O_{5+\delta}$, $PrBa_{0.8}Co_{1.95}Nb_{0.05}O_{5+\delta}$, $PrBa_{0.8}Co_{1.94}Nb_{0.06}O_{5+\delta}$, and $PrBa_{0.8}Co_{1.93}Nb_{0.07}O_{5+\delta}$, Example 1

Discovery and Application of Air Electrode

The disclosed electrode material $PrBa_{0.9}Co_{1.96}Nb_{0.04}O_{5+\delta}$ (PB9CN) when compared to a conventional electrode material $PrBaCo_2O_{5+\delta}$ (PBCO), which has increased oxygen transport properties and ORR activity. In order to suppress the Ba segregation of PBCO thereby enhancing the electrochemical stability, Nb is doped into the PBCO crystal structure to create $PrBaCo_{1.96}Nb_{0.04}O_{5+\delta}$ (PB10CN). In order to further improve the oxygen transport properties and electrochemical activity of PB10CN, Ba deficiency was introduced into PB10CN thereby forming PB9CN. As disclosed herein, PB9CN, shows desirable activity and stability, and can be seen as having applicability when applied to high-temperature electrochemical devices, for example, solid oxide fuel cells (SOFCs), protonic conducting fuel cells (PCFCs), protonic conducting electrolysis cells (PCECs), as well as low-temperature electrochemical devices, for example, proton exchange membrane fuel cells (PEMFCs), rechargeable metal-air batteries, and water splitting devices.

Synthesis of Air Electrode Powder

PrBa$_{0.9}$Co$_{1.96}$Nb$_{0.04}$O$_{5+\delta}$ (PB9CN), PrBaCo$_{1.96}$Nb$_{0.04}$O$_{5+\delta}$ (PB10CN) and PrBaCo$_2$O$_{5+\delta}$ (PBCO) powder were synthesized by the sol-gel method. A stoichiometric amount of metal nitrate was dissolved in deionized water with ethylenediaminetetraacetic acid (EDTA) and citric acid (CA). The molar ratio between metal ion, EDTA and CA was 1:1:1.5. Then ammonium hydroxide was used to adjust the pH to approximately 9. After evaporating the water, the gel was calcined at 250° C. for 10 hours. The primary powder was then grounded and calcined at 600° C. for 5 hours. Finally, the powder was fired at 1100° C. for 2 hours to get the desired phase, as confirmed by X-ray diffraction (XRD).

Figure 2A:
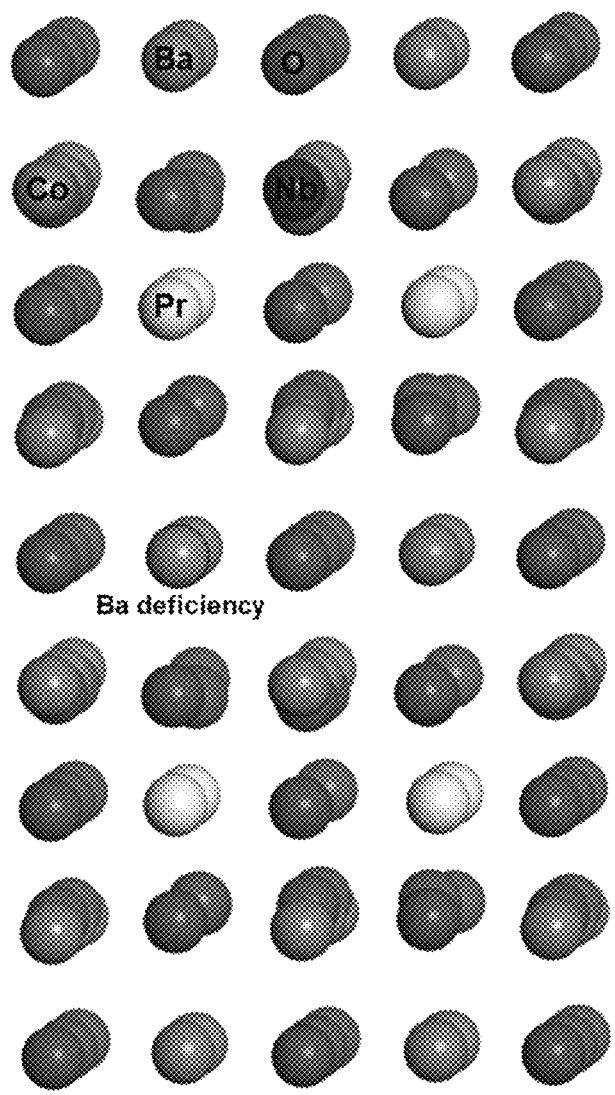
FIG. 2A shows the schematics of the PB9CN crystal structure.
Figure 2B:
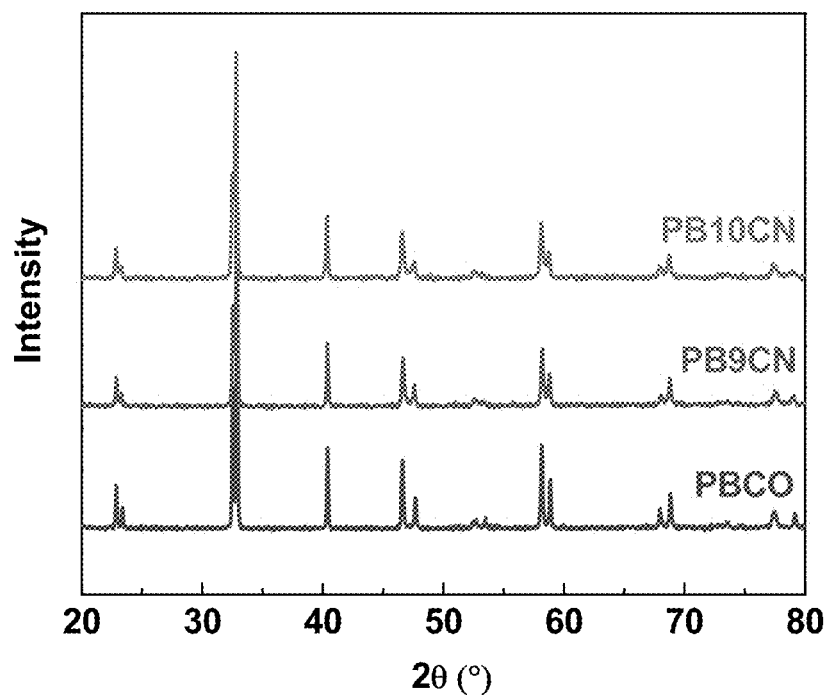
FIG. 2B is the X-Ray diffraction (XRD) pattern for PBCO (bottom), PB9CN (middle) and PB10CN (top).
Figure 2C:
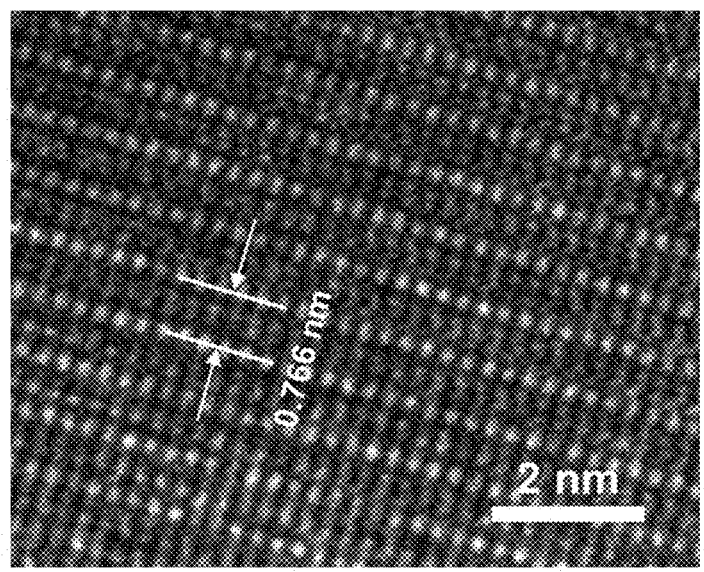
FIG. 2C to 2E are high resolution TEM images of the PB9CN lattice.
Figure 2D:
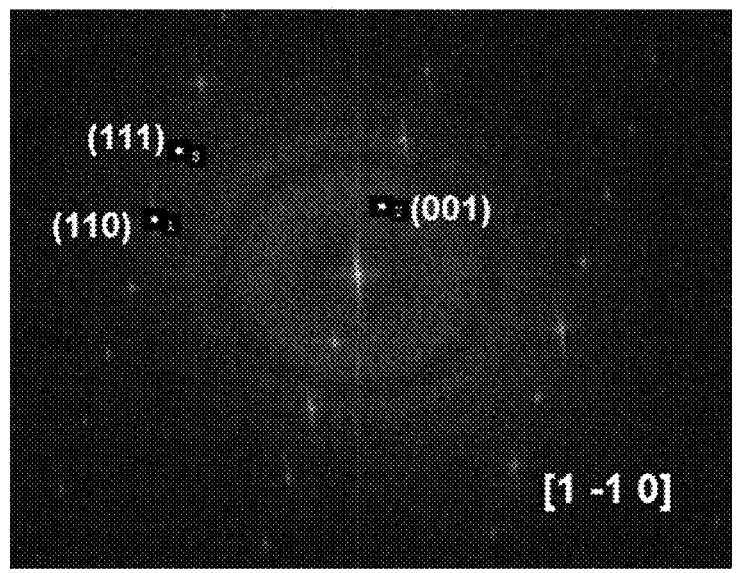
Figure 2E:
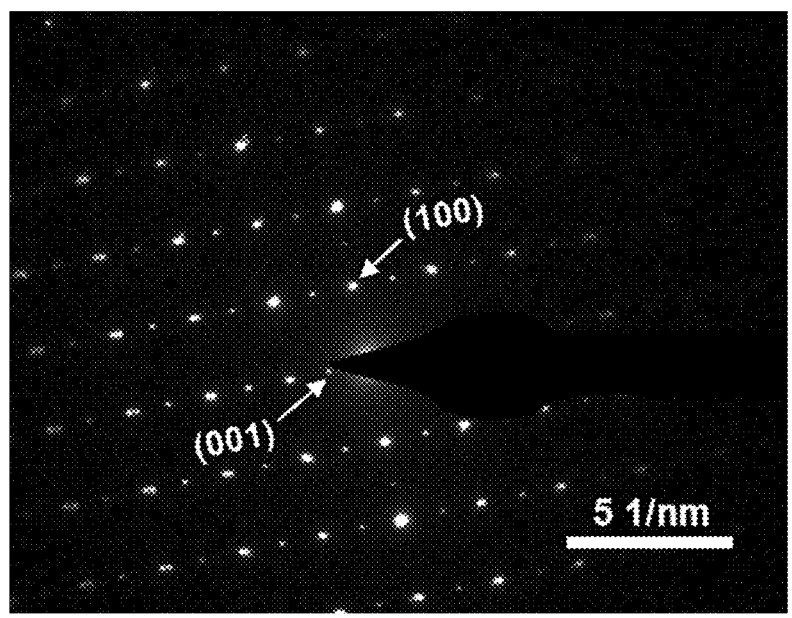

FIG. 2A shows a schematic view of the crystal structure of PB9CN. Compared to the PBCO crystal structure, Nb doped into the Co site for PB10CN. In addition, 10% Ba deficiency was created for PB9CN. PB9CN shows a double perovskite structure as confirmed by X-ray diffraction (XRD) in FIG. 2B and the high resolution-transmission electron microscopy (HR-TEM) images in FIG. 2C to FIG. 2E. The layered [Co(Nb)O$_2$]—[PrO]—[Co(Nb)O$_2$]—[BaO] structure and the Ba deficiency is vital to rapid transport of oxygen species[25-27]. Introduction of less reducible cation is beneficial for the stability of air electrode materials[28]. The content of Nb as the B-site ion was 2% as determined by Energy-dispersive X-ray spectroscopy (EDS).

Preparation of Symmetrical Cells and Single Cells

To fabricate symmetrical cells, Sm$_{0.2}$Ce$_{0.8}$O$_{1.9}$ (SDC) and BaZr$_{0.1}$Ce$_{0.7}$Y$_{0.1}$Yb$_{0.1}$O$_{3-\delta}$ (BZCYYb) powder was mixed with a sufficient amount of of PVB then dry pressed and sintered at 1450° C. for 5 hours. PB9CN, PB10CN, and PBCO ink (air electrode powder mixed with V-006) were brush painted on both sides of the electrolyte followed by firing at 950° C. for 2 hours. To fabricate single cells, Ni—Gd$_{0.1}$Ce$_{0.9}$O$_{1.95}$ (GDC) and Ni-BZCYYb half cells were prepared by tape casting and sintering at 1450° C. for 5 hours. The air electrode ink was brush painted on the GDC or BZCYYb electrolyte and fired at 950° C. for 2 hours. For all the symmetrical cells and single cells, the effective area is about 0.28 cm$^2$.

Electrochemical Measurements

For symmetrical cell measurement, two pieces of silver mesh were used as current collector. Impedance spectra were acquired using a Solartron 1255 HF frequency response analyzer interfaced with an EG&G PAR potentiostat model 273A with an AC amplitude of 10 mV in the frequency range from 100 kHz to 0.01 Hz. The stability test was performed at 600 and 550° C. under the OCV condition. For the evaluation of GDC based single cells, wet hydrogen (with 3 vol % H$_2$O) was used as fuel and ambient air (without flowing) as oxidant. For the evaluation of BZCYYb based single cells, wet hydrogen (with 3 vol % H$_2$O) was supplied to the fuel electrode and humidified air was supplied to the air electrode. The cell performance was monitored with an Arbin multi-channel electrochemical testing system.

Phase structure of air electrode powders were characterized by X-ray diffraction (Panalytical)(Pert PRO Alpha-1 XRD). The microstructure and morphology of the cells were examined by a scanning electron microscope (SEM, LEO 1530). The Nb content of PB9CN powder sample and the elemental distribution at the surface of PBCO sample were characterized by a scanning transmission electron microscope (STEM, Hitachi HD-2700). Surface kinetic coefficient (k) and chemical diffusion coefficient (D) were characterized by electrical conductivity relaxation (ECR) measurement. Oxygen non-stoichiometry was determined by combination of iodometric titration at room temperature and thermogravimetric analysis (TGA) at elevated temperatures.

Figure 5A:
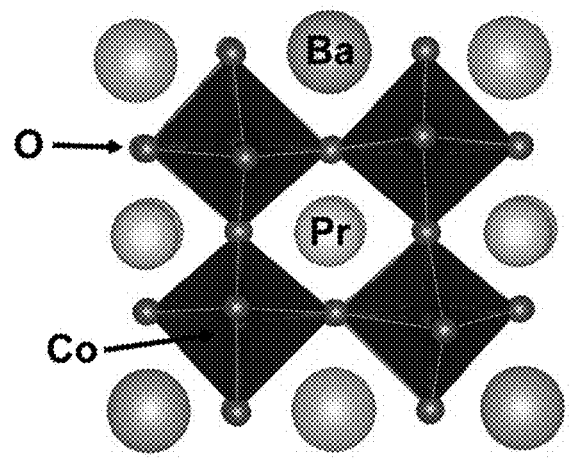
Figure 5B:
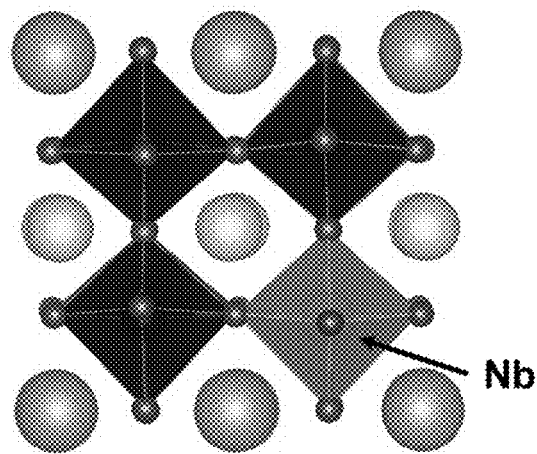

The Vienna ab initio simulation package (VASP) is used for theoretical calculations. The interactions between the valence electrons and ion core is described by projector augmented wave (PAW) formalism of density functional theory[21]. The exchange correlation functional is depicted by the spin-polarized generalized gradient approximation proposed by Perdew, Burke, and Ernzerhof (PBE)[22]. The Gaussian smearing method was used[23], and the width of smearing was chosen as 0.05 eV. Our plane wave base uses a kinetic energy cutoff of 400 eV. The Monkhorst-Pack k-point grid is used for sampling the Brillouin region with a k-point mesh of 7×7×7 for the bulk calculation and 5×5×1 for the surface model[24]. The bulk models are shown in FIGS. 5A and 5B, with the size of 8.00 Å×7.76 Å×7.63 Å, containing 4 Pr, 4 Ba, 8 Co, and 24 O atoms. After one Co atoms is replaced by Nb, the supercell size is 7.94 Å×7.83 Å×7.74 Å, with the volume slightly increased. The surface slab model is shown in FIGS. 5E and 5F, with seven atomic layers, and the lateral size is 8.00 Å×7.63 Å. For the geometry optimizations of bulk, we allow the volume of the supercell relaxed, as well as all the internal coordinates, until the force on each atom is less than 0.01 eV/Å. For the surface model, the bottom two atomic layer are fixed, and the other atoms are allowed to relax. The self-consistent convergence criterion for the calculation of the ground state energy is less than 10$^{-5}$ eV FIG. 2A shows a schematic view of the crystal structure of PB9CN. Compared to the PBCO crystal structure, Nb doped into the Co site for PB10CN. In addition, 10% Ba deficiency was created for PB9CN. PB9CN shows a double perovskite structure as confirmed by X-ray diffraction (XRD) in FIG. 2B and the high resolution-transmission electron microscopy (HR-TEM) images in FIG. 2C to FIG. 2E. Without wishing to be limited by theory, the layered [Co(Nb)O$_2$]—[PrO]—[Co(Nb)O$_2$]—[BaO] structure and the Ba deficiency is directly relates to the rapid transport of oxygen species[25-27]. Introduction of less reducible cation provides for the stability of air electrode materials[28]. The content of Nb as the B-site ion was 2% as determined by Energy-dispersive X-ray spectroscopy (EDS).

Double perovskite material PrBaCo$_2$O$_{5+\delta}$ (PBCO) shows fast oxygen transport properties, which makes it a good candidate as air electrode materials for SOFCs[29]. However, due to the segregation behavior, the stability of PBCO is questionable and not commonly reported[14,15,30]. To suppress the surface segregation, less reducible cation, Nb, was doped into the PBCO crystal structure to create PrBaCo$_{1.96}$Nb$_{0.04}$O$_{5+\delta}$ (PB10CN), the XRD pattern of both PBCO and PB were shown in FIG. 2B.

Figure 3A:
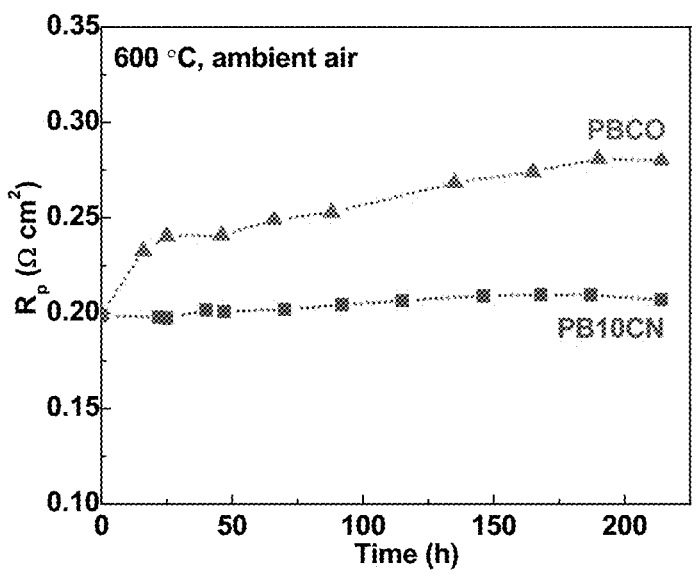
FIGS. 3A to 3C provide an electrochemical stability comparison of PB10CN and PBCO.
Figure 3B:
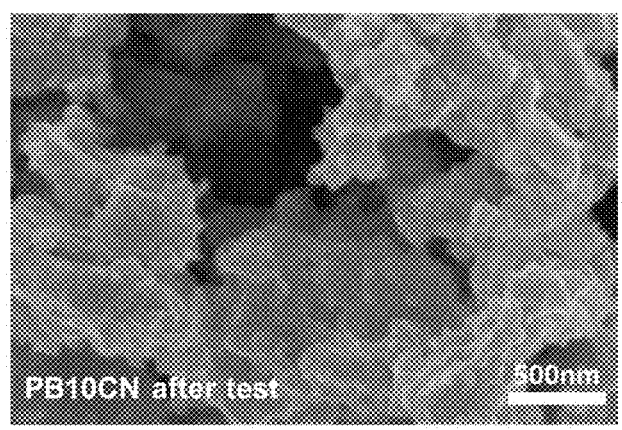
Figure 3C:
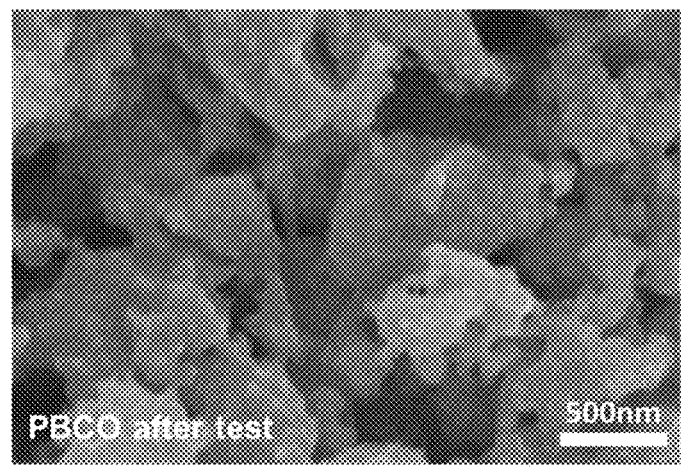

The electrochemical stability of PBCO and PB10CN on SDC-based symmetrical cells was first evaluated. FIG. 3A compares the change of interfacial polarization resistance (R$_p$) of both materials at 600° C. under the OCV condition. Initially, PB10CN and PBCO show similar R$_p$. After about 200 hours' operation, the R$_p$ of PBCO increased about 25%. However, the R$_p$ of PBCN10 was relatively stable. FIGS. 3B and 3C show the surface of PBCO and PB10CN electrodes after the stability test at 600° C. Formation of particles took place on the surface of PBCO, however, the surface of PB10CN maintained clean.

Figure 4A:
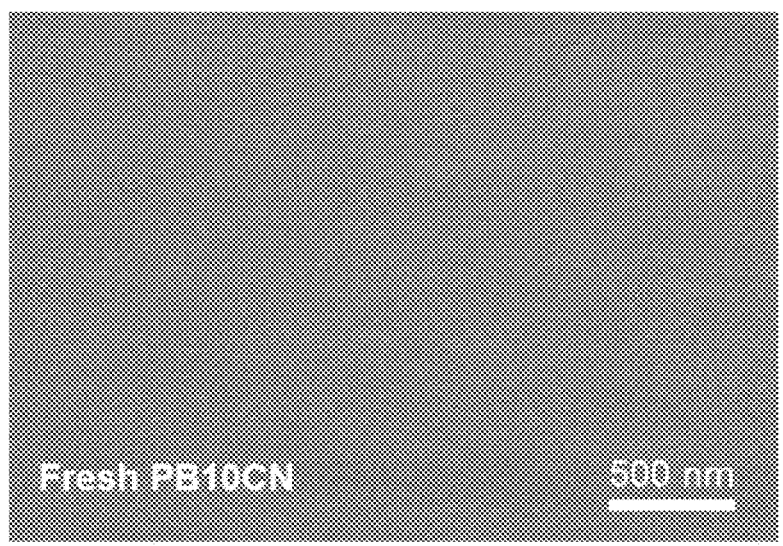
FIGS. 4A to 4E show the suppression of Ba segregation by Nb doping.
Figure 4B:
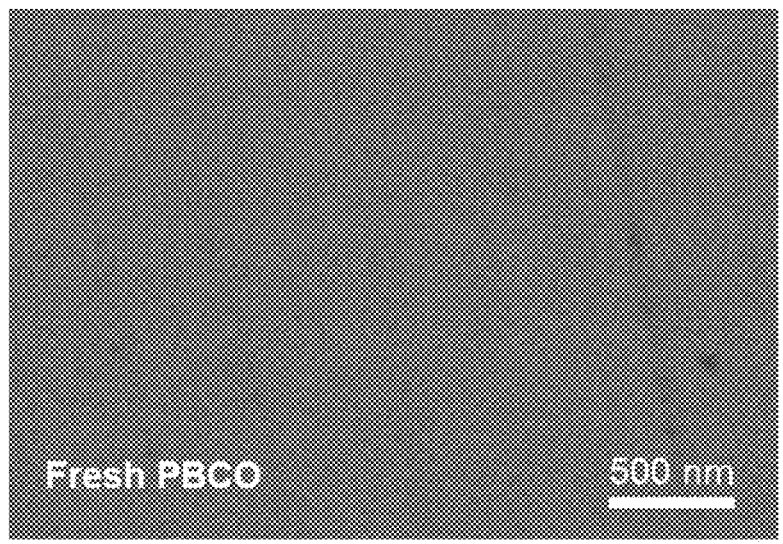
Figure 4C:
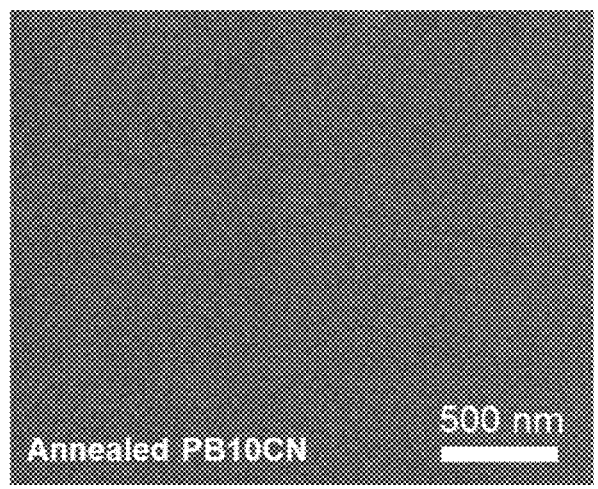
Figure 4D:
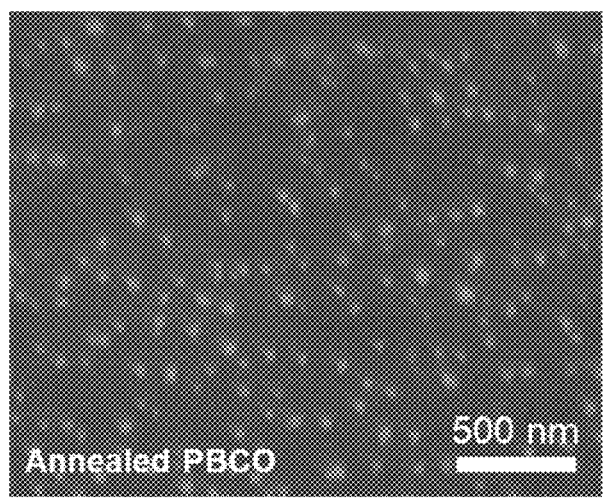
Figure 4E:
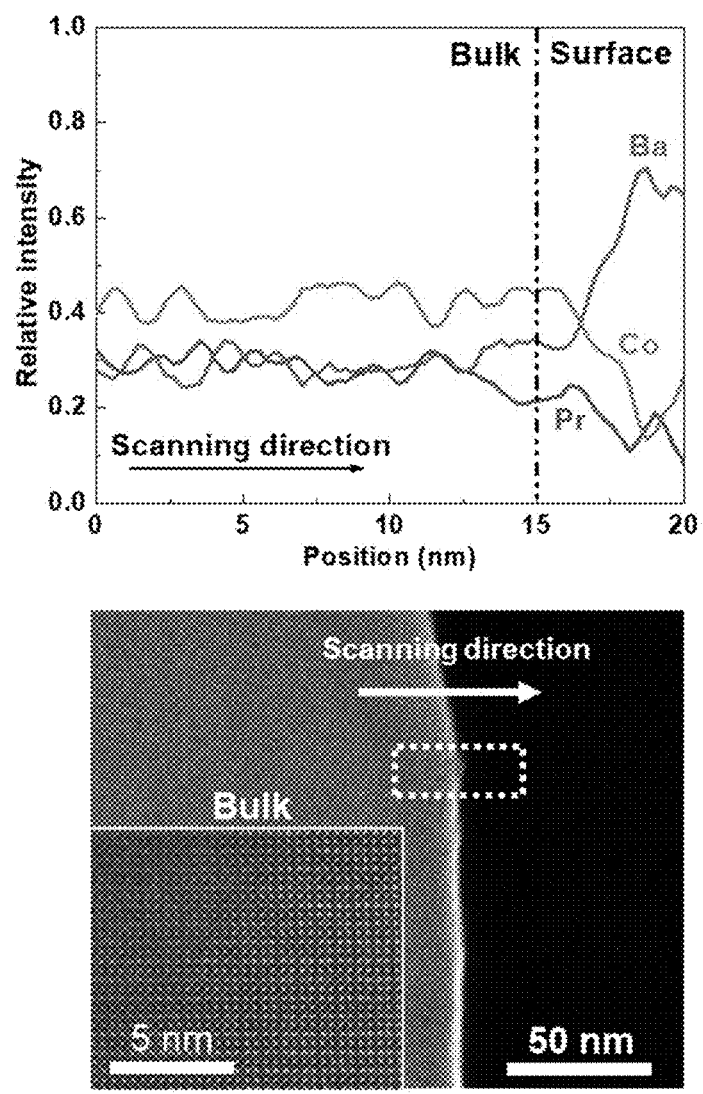

In order to eliminate the complex microstructure of electrodes, PBCO and PB10CN dense samples were prepared. After polishing the surface, these samples were annealed at 600° C. for 20 hours. FIGS. 4A and 4B show the fresh clean surface of PBCO and PB after polishing. FIGS. 4C and 4D show the surface after annealing. After annealing, the surface of PB10CN didn't show an obvious change. However, the particle precipitated to the surface of the PBCO sample as compared in FIGS. 4C and 4D. The surface of PBCO was characterized by STEM. As shown in FIG. 4E, a linear scan of elemental distribution at the precipitated particle on the surface of PBCO illustrates that Ba segregation took place at the surface of PBCO during the annealing process, which is in accordance with previous studies[15,30]. The bulk material maintains the double perovskite structure. With Nb doping, such segregation was successfully suppressed, thereby enhancing the electrochemical stability.

Theoretical Calculations

Figure 5C:
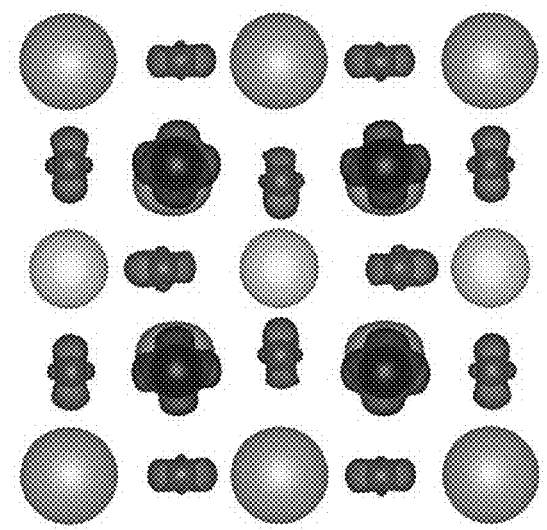
Figure 5D:
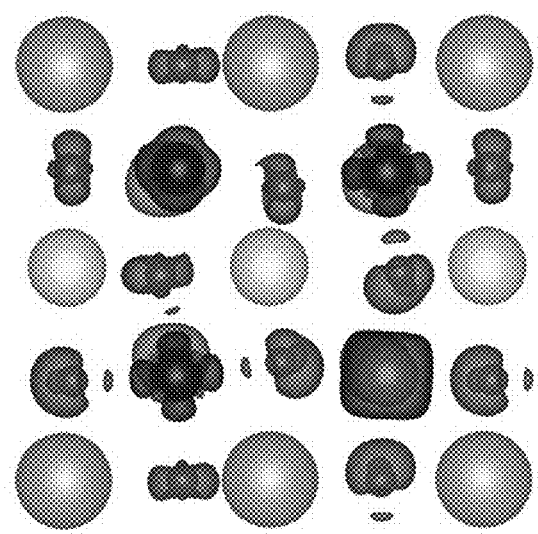

A theoretical calculation based on density functional theory (DFT) was conducted to develop a molecular-level understanding as it relates to the enhancement of stability by Nb doping. The cohesive energy and the formation energy of PBCO without (FIG. 5A) and with Nb doping (FIG. 5B). The cohesive energy is defined as $$E_c = E_T - \Sigma_i n_i E_i$$

where $E_T$ is the total energy of the system, $E_i$ is the energy of an isolated atom i, and $n_i$ is the amount of atom i in the system. The formation energy is defined as $$E_f = E_T - \sum_j n_j E_j$$

where $E_T$ is the total energy of the system, $E_j$ is the energy of an atom j in its corresponding bulk, and $n_j$ is the amount of atom j in the system. The cohesive energy and formation energy of the Nb doped model are 8.85 eV and 6.97 eV more stable than those of the undoped system, respectively, indicating that Nb doping significantly enhanced that structure stability of PBCO. As shown in FIGS. 5C and 5D, Nb doping can transfer more electrons from the metal atoms to oxygen atoms. As a result, the framework is enhanced, resulting in a more stable structure.

In addition, the surface segregation energy of Ba was calculated, which is defined as the energy difference between FIGS. 5E and 5F. Compared to the undoped system, Nb doping increases the Ba segregation energy by 0.30 eV. In addition, after Nb doping the segregation increases by 0.30 eV. These results are consistent with that Nb doping enhanced cohesive and formation energies, as well as the electronic structure analysis. All the calculated energy values are listed in FIG. 5G.

Without wishing to be limited by theory, creating cation deficiency is an effective method to improve the electrochemical performance of air electrode materials[27,31,32]. By creating Ba deficiencies ($V_{Ba}"$), more electron holes (h') and/or oxygen vacancies (Vo") can be generated to compensate the charge neutrality. Higher concentration of electron holes can enhance the overall electrical conductivity and higher oxygen vacancies can improve the oxygen ion transport properties. Both cases can have beneficial effects on the overall ORR and OER activities[32-34].

Figure 6A:
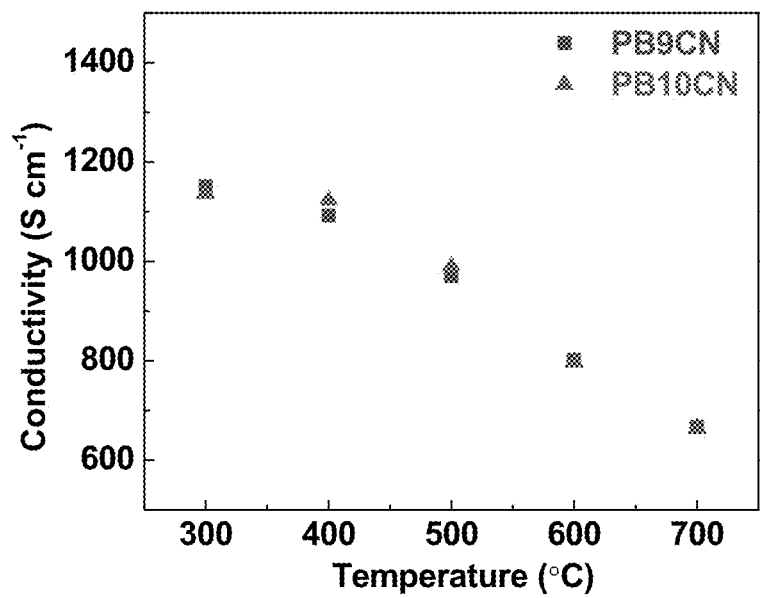
FIGS. 6A to 6D show the improvement in catalytic activity obtained by Ba deficiency.

As it relates to the effects of Ba deficiencies, the electrical conductivity of $PrBa_{0.9}Co_{1.96}Nb_{0.04}O_{5+\delta}$ (PB9CN) and $PrBaCo_{1.96}Nb_{0.04}O_{5+\delta}$ (PB10CN) were compared. As shown in FIG. 6A, both PB9CN and PB10CN showed adequate and comparable electrical conductivity at intermediate temperatures (~800 S cm$^{-1}$ at 600° C.). The similar electrical conductivity indicated that $V_{Ba}"$ did not have a noticeable influence on the concentration of electron holes.

Figure 6B:
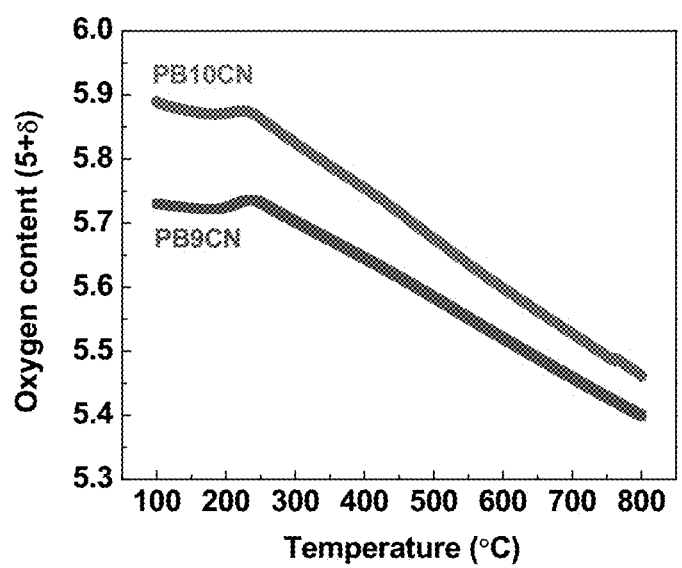
Figure 6C:
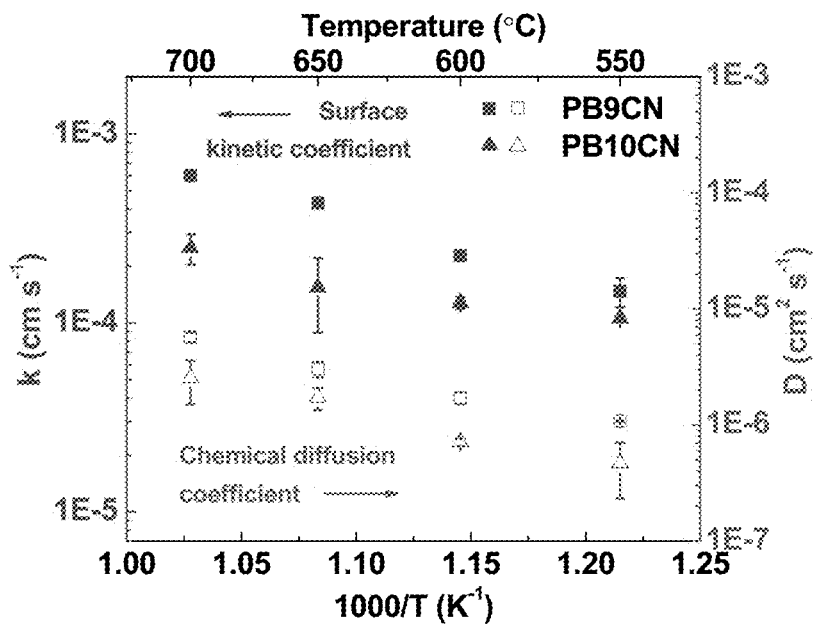
Figure 6D:
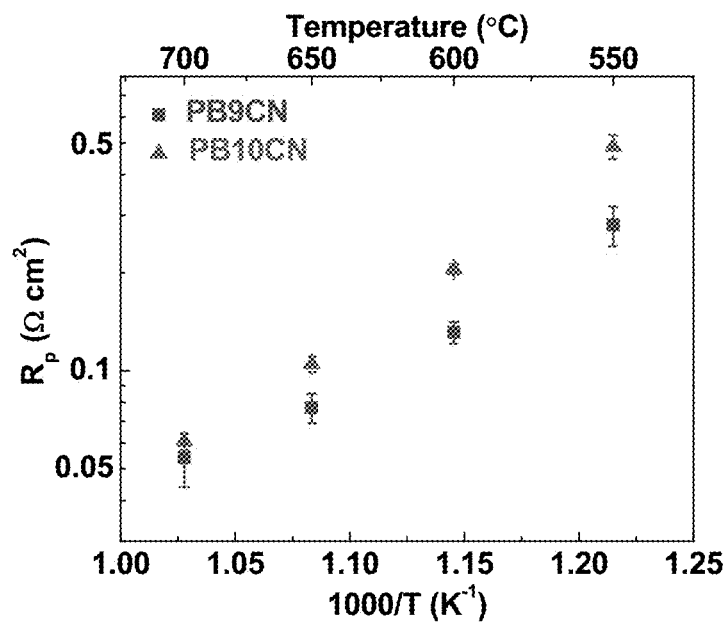

In other words, more Vo" would be created by $V_{Ba}"$. The oxygen non-stoichiometry of PB9CN and PB10CN was characterized by iodometric titration and TGA. As compared in FIG. 6B, PB9CN has a higher concentration of oxygen vacancy than PB at temperatures up to 800° C. Two oxygen transport properties, i.e., surface kinetic coefficient (k) and chemical diffusion coefficient (D) were further measured by electrical conductivity relaxation (ECR) method. At intermediate temperatures, PB9CN exhibited better oxygen transport properties than PB as shown in FIG. 6C. Finally, the improved electrochemical properties were demonstrated on SDC based symmetrical cells. FIG. 6D provides a comparison of the $R_p$ of PB9CN and PB10CN at 550-700° C. The $R_p$ of PB9CN was lower than that of PB10CN. For example, at 550° C., the $R_p$ of PB9CN was ~0.25 $\Omega cm^2$, which is comparable or better than other existing air electrode materials. These results proved that creating Ba deficiency dramatically improved the electrochemical performance by enhancing the oxygen transport properties.

Figure 7A:
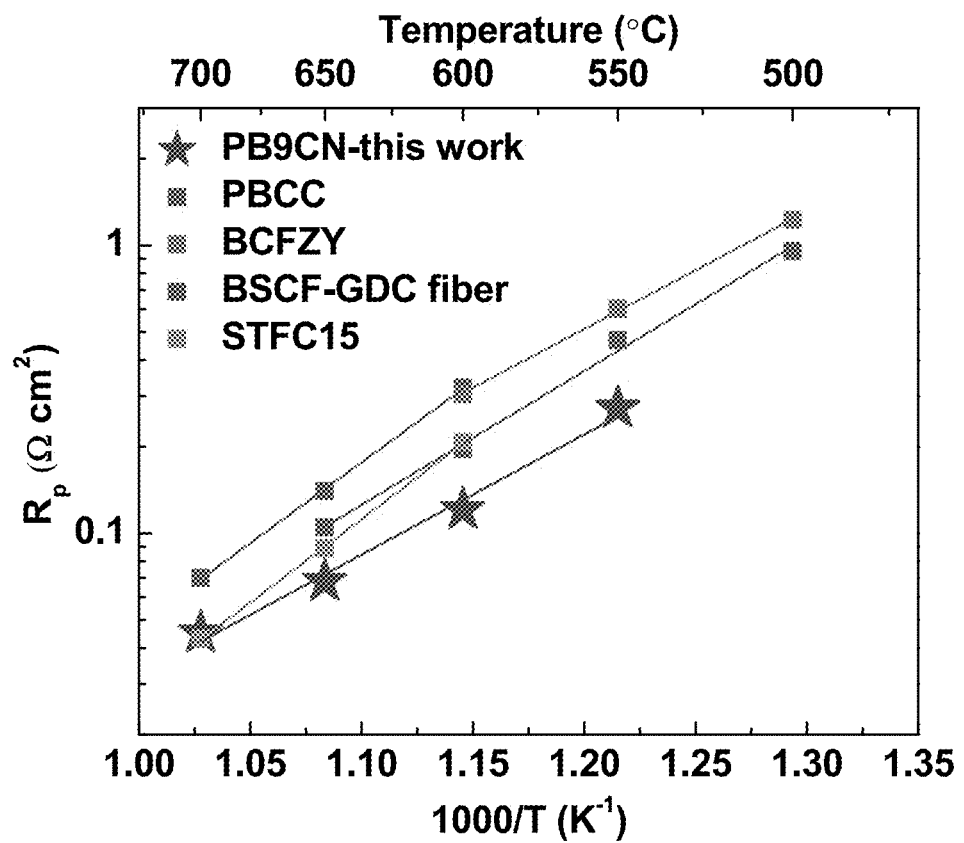
FIG. 7A to 7E depict measurements of the electrochemical performance of PB9CN applied on an oxygen ion conducting electrolyte.
Figure 7B:
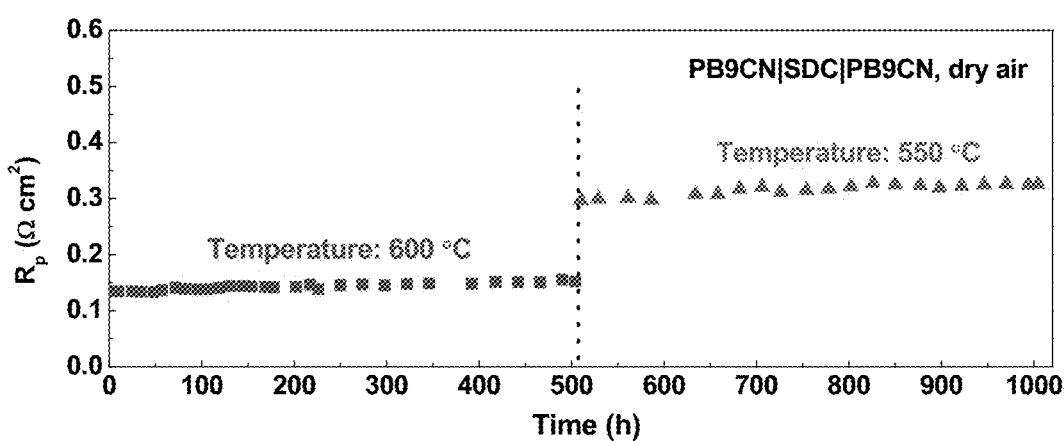
Figure 7C:
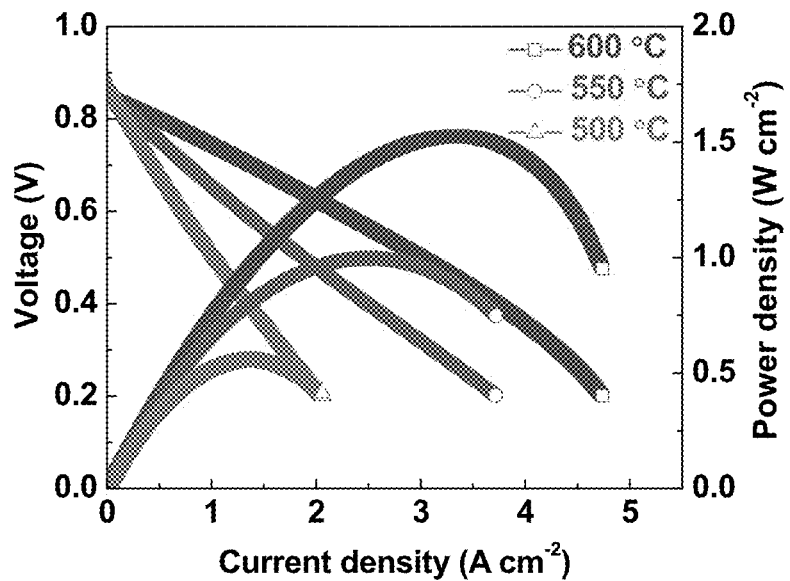
Figure 7D:
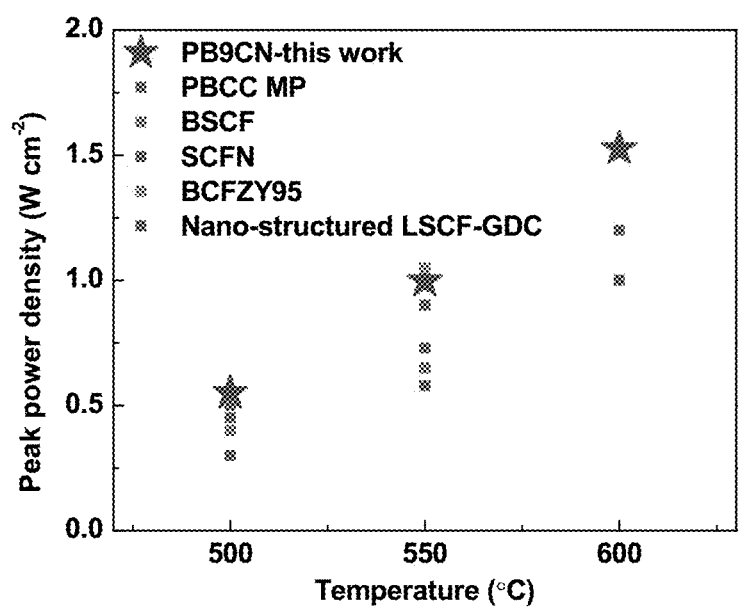
Figure 7E:
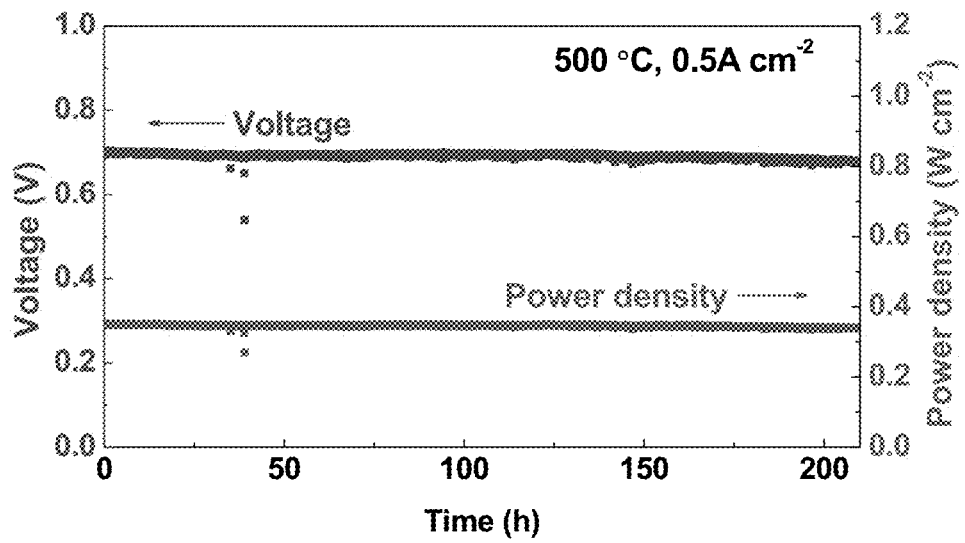

The electrochemical performance of the PB9CN air electrode was determined on multiple types of SOCs. FIG. 7A compares the $R_p$ of PB9CN with several state-of-the-art air electrode materials on SDC electrolyte supported symmetrical cells. Among all these materials, PB9CN shows the best performance. For example, at 650° C. $R_p$ of PB9CN is only 0.068 $\Omega cm^2$, lower than that of STFC-15 (~0.089 $\Omega cm^2$)[17], BSCF-GDC core shell fibre (~0.105 $\Omega cm^2$)[35] and PBCC (~0.14 $\Omega cm^2$)[18]. The activation energy of PB9CN is 79.98 kJ mol$^{-1}$, which is similar to the activation energy of BCFZY (79.2 kJ mol$^{-1}$)[19], the low activation energy guarantees the good ORR activity of PB9CN at even lower temperatures. A stable $R_p$ at 600 and 550° C. for more than 1000 hours is shown in FIG. 7B. PB9CN was then applied on GDC based single cells. FIG. 7C shows the I-V-P curves of the single cell with a configuration of Ni-GDC|GDC|PB9CN at 600, 550, and 500° C. According to the comparison on peak power density of GDC or SDC based single cells in FIG. 7D, PB9CN air electrode outperforms most of the other air electrode materials or catalysts[36-40]. Moreover, the single cell shows stable performance at 500° C. for over 200 hours without obvious performance degradation as shown in FIG. 7E.

Figure 8A:
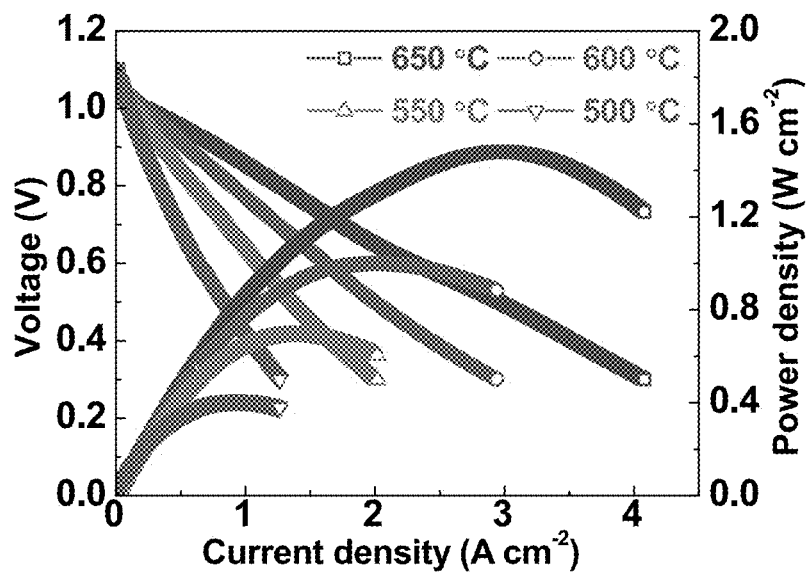
FIG. 8A to 8F depict the electrochemical performance of PB9CN applied on a proton conducting electrolyte.
Figure 8B:
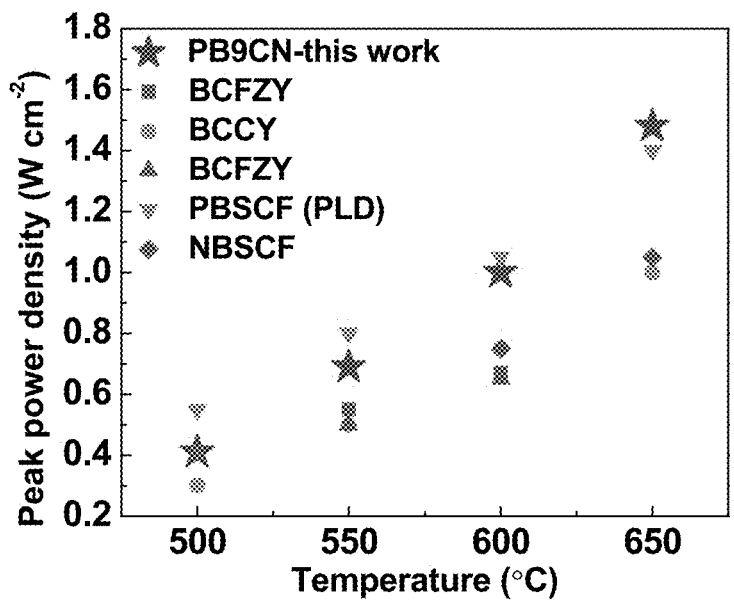
Figure 8C:
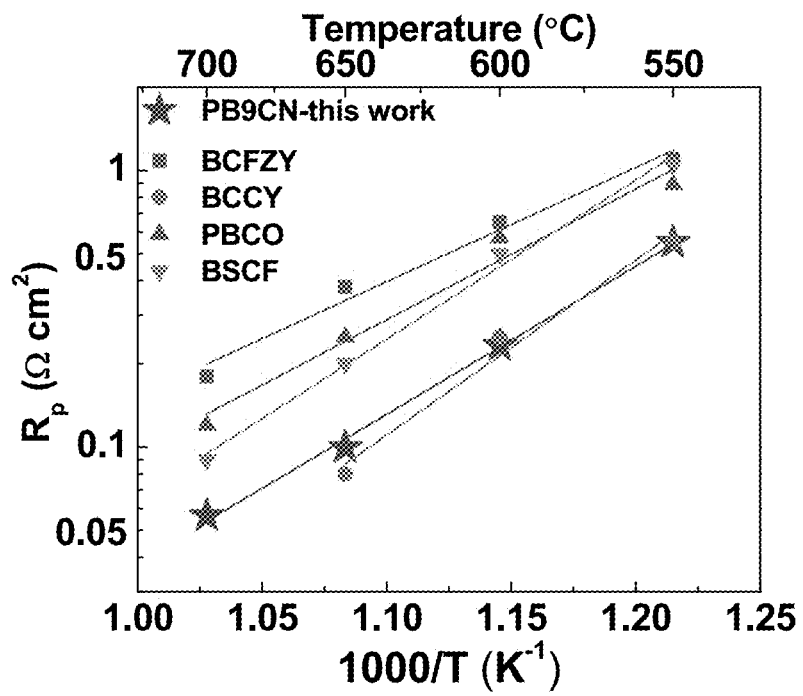
Figure 8D:
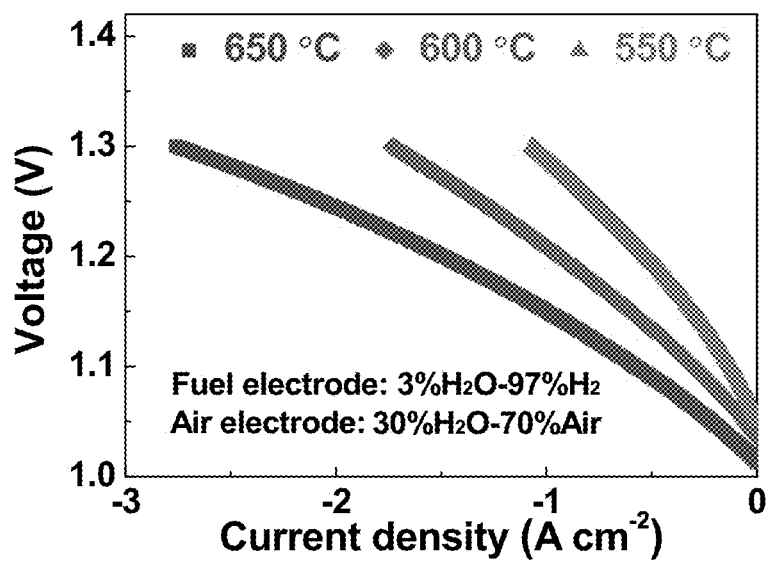
Figure 8E:
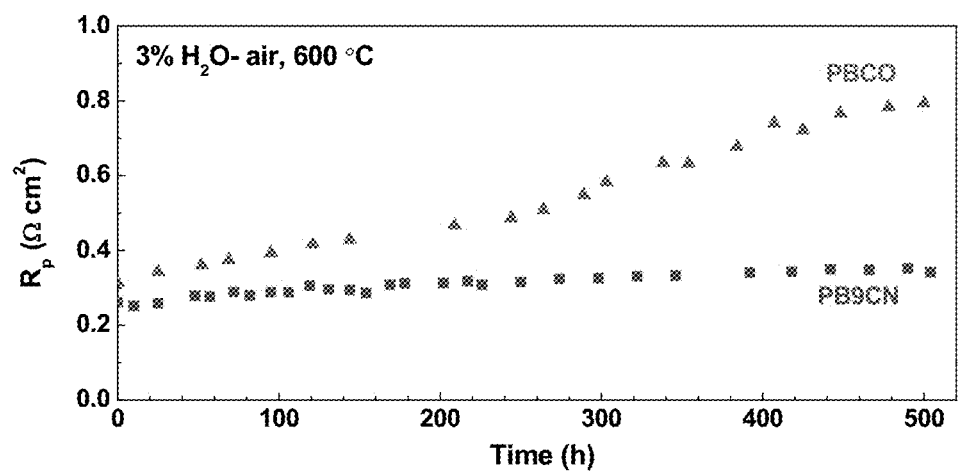
Figure 8F:
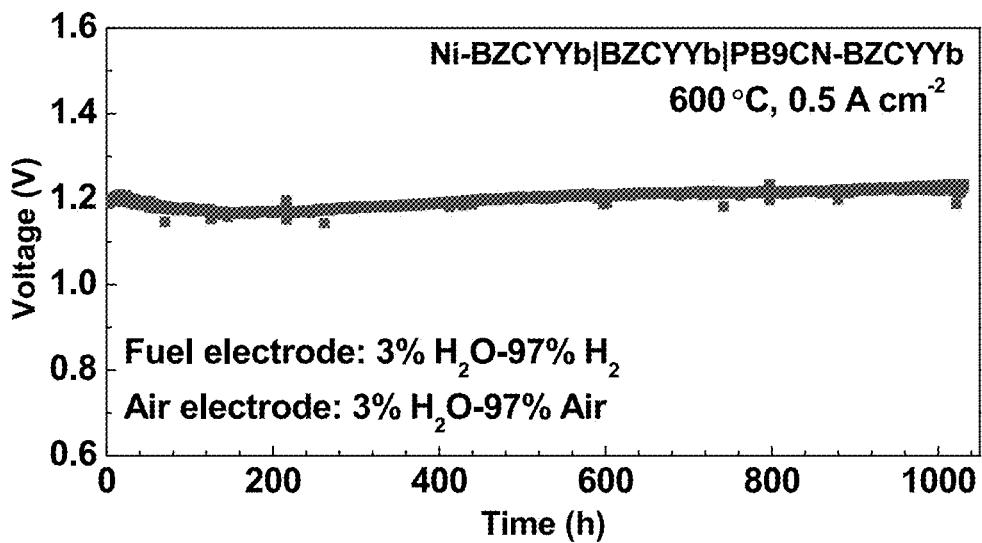
Figure 8G:
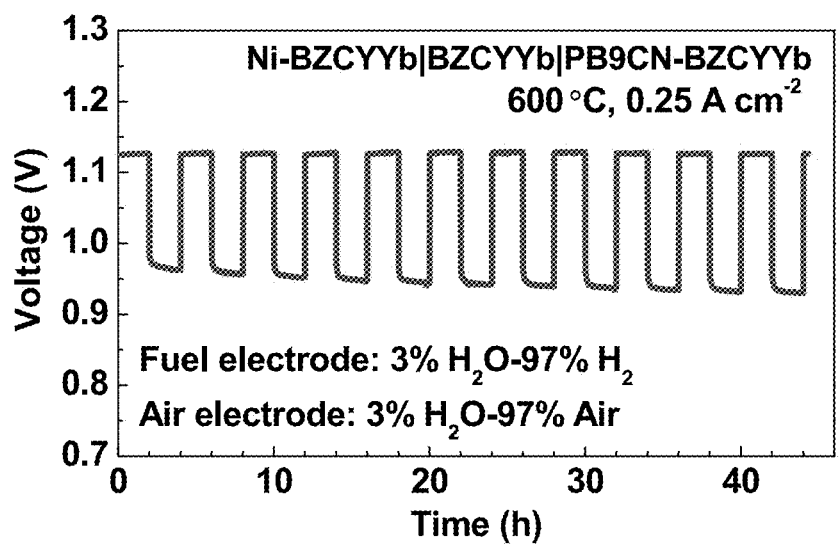
FIG. 8G shows reversible operation between fuel cell mode and electrolysis cell mode of a single cell with a configuration of Ni-BZCYYb|BZCYYb|PB9CN-BZCYYb at 600° C.

Because the observed rapid and stable oxygen transport properties of PB9CN is beneficial for proton conduction as well[8], the electrochemical performance of PB9CN on single cells based on proton conducting electrolytes, i.e. $BaZr_{0.1}Ce_{0.7}Y_{0.1}Yb_{0.1}O_{3-\delta}$ (BZCYYb) was tested. FIG. 8A shows the I-V-P curves of the BZCYYb-based single cell with PB9CN-BZCYYb (mass ratio 7:3) composite air electrode at 650, 600, 550, and 500° C. As shown in FIG. 8B, the single cell performance of PB9CN is enhanced when compared to other air electrode materials and is comparable to $PrBa_{0.5}Sr_{0.5}Co_{1.5}Fe_{0.5}O_{5+\delta}$ (PBSCF) with a PLD layer[5,20,26,41,42]. The applicability of PB9CN to protonic ceramic electrolysis cells (PCECs) was also determined. Because water is necessary to supply to the air electrode during the electrolysis for PCECs, the $R_p$ of PB9CN on BZCYYb based symmetrical cells with ~3 vol % $H_2O$ was tested. As shown in FIG. 8C, the $R_p$ of PB9CN is comparable or lower than other air electrode materials for PCFCs[20,41,43,44]. PB9CN was then applied to BZCYYb-based PCECs as an air electrode with humidified air (~30 vol % $H_2O$) in the air electrode and humidified $H_2$ (~3 vol % $H_2$) in the fuel electrode. When the applied voltage was 1.3V, the electrolysis current densities were 2.75, 1.73, and 1.07 A cm$^{-2}$ at 650, 600, and 550° C. The stability of PB9CN against water was examined on both BZCYYb based symmetrical cells (FIG. 8E) and electrolysis single cells (FIG. 8F and FIG. 8G). Under both cases, a slight performance degradation was shown during the first tens of hours. However, the performance maintained stable for the following hundreds of hours. These outstanding electrochemical performance and stability confirms the applicability of PB9CN as an air electrode material for multiple kinds of solid oxide electrochemical cells.

The present disclosure provides a description of the structure and use of non-limiting illustrative embodiments. Although certain embodiments have been described with a certain degree of particularity, or with reference to one or more individual embodiments, those skilled in the art could make numerous alterations to the disclosed embodiments without departing from the scope of this invention. As such, the various illustrative embodiments of the devices are not intended to be limited to the particular forms disclosed. Rather, they include all modifications and alternatives falling within the scope of the claims, and embodiments other than the one shown may include some or all of the features of the depicted embodiment. For example, components may be omitted or combined as a unitary structure, and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

APPENDIX

1 Liu, M., Lynch, M. E., Blinn, K., Alamgir, F. M. & Choi, Y. Rational SOFC material design: new advances and tools. *Materials Today* 14, 534-546, doi:10.1016/s1369-7021(11)70279-6 (2011).

2 Park, S., Shao, Y., Liu, J. & Wang, Y. Oxygen electrocatalysts for water electrolyzers and reversible fuel cells: status and perspective. *Energy & Environmental Science* 5, doi:10.1039/c2ee22554a (2012).

3 Pellow, M. A., Emmott, C. J. M., Barnhart, C. J. & Benson, S. M. Hydrogen or batteries for grid storage? A net energy analysis. *Energy & Environmental Science* 8, 1938-1952, doi:10.1039/c4ee04041d (2015).

4 Chen, Y. et al. A robust fuel cell operated on nearly dry methane at 500° C. enabled by synergistic thermal catalysis and electrocatalysis. *Nature Energy*, doi:10.1038/s41560-018-0262-5 (2018).

5 Duan, C. et al. Highly durable, coking and sulfur tolerant, fuel-flexible protonic ceramic fuel cells. *Nature* 557, 217-222, doi:10.1038/s41586-018-0082-6 (2018).

6 Chuancheng Duan, R. K., Huayang Zhu, Neal Sullivan, Liangzhu Zhu, Liuzhen Bian, Dylan Jennings and Ryan O'Hayre. Highly efficient reversible protonic ceramic electrochemical cells for power generation and fuel production. *nature Energy* 4, 230-240, doi:10.1038/s41560-019-0333-2 (2019).

7 Vollestad, E. et al. Mixed proton and electron conducting double perovskite anodes for stable and efficient tubular proton ceramic electrolysers. *Nat Mater*, doi:10.1038/s41563-019-0388-2 (2019).

8 Ding, H. et al. Self-sustainable protonic ceramic electrochemical cells using a triple conducting electrode for hydrogen and power production. *Nature Communications* 11, doi:10.1038/s41467-020-15677-z (2020).

9 Ding, D., Li, X., Lai, S. Y., Gerdes, K. & Liu, M. Enhancing SOFC cathode performance by surface modification through infiltration. *Energy & Environmental Science* 7, doi:10.1039/c3ee42926a (2014).

10 Gao, Z., Mogni, L. V., Miller, E. C., Railsback, J. G. & Barnett, S. A. A perspective on low-temperature solid oxide fuel cells. *Energy & Environmental Science* 9, 1602-1644, doi:10.1039/c5ee03858h (2016).

11 Kim, J. et al. Proton conducting oxides: A review of materials and applications for renewable energy conversion and storage. *Renewable and Sustainable Energy Reviews* 109, 606-618, doi:10.1016/j.rser.2019.04.042 (2019).

12 Duan, C., Huang, J., Sullivan, N. & O'Hayre, R. Proton-conducting oxides for energy conversion and storage. *Applied Physics Reviews* 7, doi:10.1063/1.5135319 (2020).

13 Chen, Y. et al. A robust and active hybrid catalyst for facile oxygen reduction in solid oxide fuel cells. *Energy & Environmental Science* 10, 964-971, doi:10.1039/c6ee03656b (2017).

14 Téllez, H., Druce, J., Ju, Y.-W., Kilner, J. & Ishihara, T. Surface chemistry evolution in $LnBaCo_2O_5$+double perovskites for oxygen electrodes. *International Journal of Hydrogen Energy* 39, 20856-20863, doi:10.1016/j.ijhydene.2014.06.102 (2014).

15 Wei, B., Schroeder, M. & Martin, M. Surface Cation Segregation and Chromium Deposition on the Double-Perovskite Oxide $PrBaCo_2O_{5+\delta}$. *ACS Appl Mater Interfaces* 10, 8621-8629, doi:10.1021/acsami.7b17881 (2018).

16 Kim, J.-H. & Manthiram, A. Layered $LnBaCo2O5+\delta$ perovskite cathodes for solid oxide fuel cells: an overview and perspective. *Journal of Materials Chemistry* A 3, 24195-24210, doi:10.1039/c5ta06212h (2015).

17 Zhang, S.-L. et al. Cobalt-substituted $SrTi0.3Fe0.7O3-\delta$: a stable high-performance oxygen electrode material for intermediate-temperature solid oxide electrochemical cells. *Energy & Environmental Science* 11, 1870-1879, doi:10.1039/c8ee00449h (2018).

18 Chen, Y. et al. A highly active, CO2-tolerant electrode for the oxygen reduction reaction. *Energy & Environmental Science* 11, 2458-2466, doi:10.1039/c8ee01140k (2018).

19 Duan, C., Hook, D., Chen, Y., Tong, J. & O'Hayre, R. Zr and Y co-doped perovskite as a stable, high performance cathode for solid oxide fuel cells operating below 500° C. *Energy & Environmental Science* 10, 176-182, doi: 10.1039/c6ee01915c (2017).

20 Song, Y. et al. Self-Assembled Triple-Conducting Nanocomposite as a Superior Protonic Ceramic Fuel Cell Cathode. *Joule*, doi:10.1016/j.joule.2019.07.004 (2019).

21 Kresse, G. Efficient iterative schemes for ab initio total-energy calculations using a plane-wave basis set. *PHYSICAL REVIEW B* 54, 11169-11186 (1996).

22 John P. Perdew, K. B., Matthias Ernzerhof. Generalized Gradient Approximation Made Simple. *PHYSICAL REVIEW LETTERS* 77, 3865-3868 (1996).

23 Methfessel, M. & Paxton, A. T. High-precision sampling for Brillouin-zone integration in metals. *Phys Rev B Condens Matter* 40, 3616-3621, doi:10.1103/physrevb.40.3616 (1989).

24 Monkhorst, H. J. & Pack, J. D. Special points for Brillouin-zone integrations. *Physical Review B* 13, 5188-5192, doi:10.1103/PhysRevB.13.5188 (1976).

25 Choi, S. et al. Highly efficient and robust cathode materials for low-temperature solid oxide fuel cells: PrBa$_{0.5}$Sr$_{0.5}$Co$_{(2-x)}$Fe$_{(x)}$O$_{(5+\delta)}$. *Sci Rep* 3, 2426, doi:10.1038/srep02426 (2013).

26 Kim, J. et al. Triple-conducting layered perovskites as cathode materials for proton-conducting solid oxide fuel cells. *ChemSusChem* 7, 2811-2815, doi:10.1002/cssc.201402351 (2014).

27 Feifei Dong, M. N., Yubo Chen, Dengjie Chen, Moses O. Tad and Zongping Shao. Structural and oxygen-transport studies of double perovskites PrBa1xCo$_2$O$_{5+\delta}$ (× ¼ 0.00, 0.05, and 0.10) toward their application as superior oxygen reduction electrodes. *Journal of Materials Chemistry A* 2, 20520, doi:10.1039/C4TA04372C (2014).

28 Tsvetkov, N., Lu, Q., Sun, L., Crumlin, E. J. & Yildiz, B. Improved chemical and electrochemical stability of perovskite oxides with less reducible cations at the surface. *Nat Mater* 15, 1010-1016, doi:10.1038/nmat4659 (2016).

29 Zhang, K., Ge, L., Ran, R., Shao, Z. & Liu, S. Synthesis, characterization and evaluation of cation-ordered LnBaCo$_2$O$_{5+\delta}$ as materials of oxygen permeation membranes and cathodes of SOFCs. *Acta Materialia* 56, 4876-4889, doi:10.1016/j.actamat.2008.06.004 (2008).

30 Druce, J. et al. Surface termination and subsurface restructuring of perovskite-based solid oxide electrode materials. *Energy Environ. Sci.* 7, 3593-3599, doi:10.1039/c4ee01497a (2014).

31 Ren, R. et al. Tuning the defects of the triple conducting oxide BaCo$_{0.4}$Fe$_{0.4}$Zr$_{0.1}$Y$_{0.1}$O$_{3-\delta}$ perovskite toward enhanced cathode activity of protonic ceramic fuel cells. *Journal of Materials Chemistry A* 7, 18365-18372, doi:10.1039/c9ta04335g (2019).

31 Tang, W. et al. Understanding of A-site deficiency in layered perovskites: promotion of dual reaction kinetics for water oxidation and oxygen reduction in protonic ceramic electrochemical cells. *Journal of Materials Chemistry A*, doi:10.1039/d0ta05137c (2020).

33 Zhao, B. et al. A tailored double perovskite nanofiber catalyst enables ultrafast oxygen evolution. *Nat Commun* 8, 14586, doi:10.1038/ncomms14586 (2017).

34 Jin Suntivich, K. J. M., Hubert A. Gasteiger, John B. Goodenough, Yang Shao-Horn. A Perovskite Oxide Optimized for Oxygen Evolution Catalysis from Molecular Orbital Principles. *Science* 334, 1383-1385 (2011).

35 Lee, J. G., Park, J. H. & Shul, Y. G. Tailoring gadolinium-doped ceria-based solid oxide fuel cells to achieve 2 W cm(-2) at 550 degrees C. *Nat Commun* 5, 4045, doi:10.1038/ncomms5045 (2014).

36 Chen, Y. et al. A Highly Efficient Multi-phase Catalyst Dramatically Enhances the Rate of Oxygen Reduction. *Joule* 2, 938-949, doi:10.1016/j.joule.2018.02.008 (2018).

37 Haile, Z. S. S. M. A high-performance cathode for the next generation of solid-oxide fuel cells. *nature* (2004).

38 Song, Y. et al. A Cobalt-Free Multi-Phase Nanocomposite as Near-Ideal Cathode of Intermediate-Temperature Solid Oxide Fuel Cells Developed by Smart Self-Assembly. *Adv Mater*, e1906979, doi:10.1002/adma.201906979 (2020).

39 Kuai, X. et al. Boosting the Activity of BaCo0.4Fe0.4Zr0.1Y0.1O3−δ Perovskite for Oxygen Reduction Reactions at Low-to-Intermediate Temperatures through Tuning B-Site Cation Deficiency. *Advanced Energy Materials*, doi:10.1002/aenm.201902384 (2019).

40 Ding, C. & Hashida, T. High performance anode-supported solid oxide fuel cell based on thin-film electrolyte and nanostructured cathode. *Energy & Environmental Science* 3, doi:10.1039/c0ee00255k (2010).

41 Chuancheng Duan, J. T., Meng Shang, Stefan Nikodemski, Michael Sanders, Sandrine Ricote, Ali Almansoori, Ryan O'Hayre. Readily processed protonic ceramic fuel cells with high performance at low temperatures. *Science* 349, 1321-1326 (2015).

42 Choi, S. et al. Exceptional power density and stability at intermediate temperatures in protonic ceramic fuel cells. *Nature Energy* 3, 202-210, doi:10.1038/s41560-017-0085-9 (2018).

43 Grimaud, A. et al. Hydration Properties and Rate Determining Steps of the Oxygen Reduction Reaction of Perovskite-Related Oxides as H+-SOFC Cathodes. *Journal of The Electrochemical Society* 159, B683-B694, doi:10.1149/2.101205jes (2012).

44 Lin, Y. et al. Evaluation of Ba$_{0.5}$Sr$_{0.5}$Co$_{0.8}$Fe$_{0.2}$O$_3$–δ as a potential cathode for an anode-supported proton-conducting solid-oxide fuel cell. *Journal of Power Sources* 180, 15-22, doi:10.1016/j.jpowsour.2008.02.044 (2008).

What is claimed is:

1. A multi-functional air electrode for solid oxide electrochemical cells, comprising: PrBa$_{0.9}$Co$_{1.96}$Nb$_{0.04}$O$_{5+\delta}$.

* * * * *